(12) United States Patent
Armour et al.

(10) Patent No.: US 7,651,312 B2
(45) Date of Patent: Jan. 26, 2010

(54) TRUCK WITH TILTING DECK

(75) Inventors: Barry Douglas Armour, Dunedin (NZ); Richard Zane Wilson, Dunedin (NZ)

(73) Assignees: Barry Douglass Armour, Dunedin (NZ); Fionna Lynn Armour, Dunedin (NZ); HGW Trustee's Limited, Dunedin (NZ)

( * ) Notice: Subject to any disclaimer, the term of this patent is extended or adjusted under 35 U.S.C. 154(b) by 68 days.

(21) Appl. No.: 10/531,488

(22) PCT Filed: Oct. 22, 2003

(86) PCT No.: PCT/NZ03/00239

§ 371 (c)(1),
(2), (4) Date: Mar. 3, 2006

(87) PCT Pub. No.: WO2004/037604

PCT Pub. Date: May 6, 2004

(65) Prior Publication Data

US 2006/0182572 A1     Aug. 17, 2006

(30) Foreign Application Priority Data

Oct. 22, 2002 (NZ) .................................... 522096
Dec. 6, 2002 (NZ) .................................... 523072
Feb. 26, 2003 (NZ) .................................... 524432

(51) Int. Cl.
*B60P 3/00* (2006.01)

(52) U.S. Cl. ........................ 414/476; 414/474; 414/563; 298/12; 298/17 R; 298/22 R; 280/86; 280/787

(58) Field of Classification Search .................. 414/476, 414/563, 474; 298/12, 17 R, 22 R; 280/86, 280/787
See application file for complete search history.

(56) References Cited

U.S. PATENT DOCUMENTS

| 2,466,452 A | 4/1949 | Lisota |
| 2,466,791 A | 4/1949 | Cook |
| 3,228,547 A | 1/1966 | Coordes |
| 4,239,275 A | 12/1980 | Horneys et al. |
| 4,318,658 A | 3/1982 | McIntyre |
| 4,368,002 A | 1/1983 | Kryzyosiak, Jr. |
| 4,730,974 A | 3/1988 | Andre |
| 4,750,856 A | 6/1988 | Lapiolahti |
| 4,770,592 A | 9/1988 | Winter |

(Continued)

FOREIGN PATENT DOCUMENTS

DE     295 12 152     6/1996

(Continued)

*Primary Examiner*—Michael S Lowe
(74) *Attorney, Agent, or Firm*—Dann, Dorfman, Herrell and Skillman, P.C.

(57) ABSTRACT

A truck includes a chassis 1 supporting a cab 3 and a deck 9 which is supported at least by a rearmost axle 15 and wheels 17. The deck 9 is tiltable relative to the chassis 1 about a pivot axis 27 located in front of the rearmost axle 15 of the truck and arranged such that as the deck 9 tilts rearwardly, the chassis 1 tilts forwardly and the deck 9 lowers towards the rearmost axle. A forward part of a rear suspension arrangement may be operatively connected to the chassis 1 so that the forward part moves upwardly towards the deck 9 as the deck 9 is tilted.

4 Claims, 16 Drawing Sheets

U.S. PATENT DOCUMENTS

| | | |
|---|---|---|
| 4,929,142 A | 5/1990 | Nespor |
| 4,958,978 A | 9/1990 | Shedleski |
| 5,033,931 A | 7/1991 | Mann |
| 5,051,053 A | 9/1991 | Groeneweg |
| 5,234,308 A | 8/1993 | Mann |
| 5,433,578 A * | 7/1995 | Honan, Jr. .................. 414/476 |
| 5,667,231 A | 9/1997 | Dierks et al. |
| 5,857,825 A | 1/1999 | Rice |
| 5,887,880 A * | 3/1999 | Mullican et al. ......... 280/43.18 |
| 5,921,742 A | 7/1999 | Gearhart |
| 5,967,733 A | 10/1999 | Cash |
| 6,113,338 A | 9/2000 | Smith |
| 6,161,997 A | 12/2000 | Furlong |
| 6,290,449 B1 | 9/2001 | Lewis |
| 6,447,239 B2 | 9/2002 | Young et al. |
| 6,461,096 B1 | 10/2002 | Mentele et al. |

FOREIGN PATENT DOCUMENTS

| | | |
|---|---|---|
| DE | 198 46 340 | 4/2000 |
| EP | 0424296 | 6/1994 |
| EP | 0517634 | 1/1996 |
| EP | 0586318 | 3/1997 |
| WO | 8102712 | 10/1981 |
| WO | 9609185 | 3/1996 |

* cited by examiner

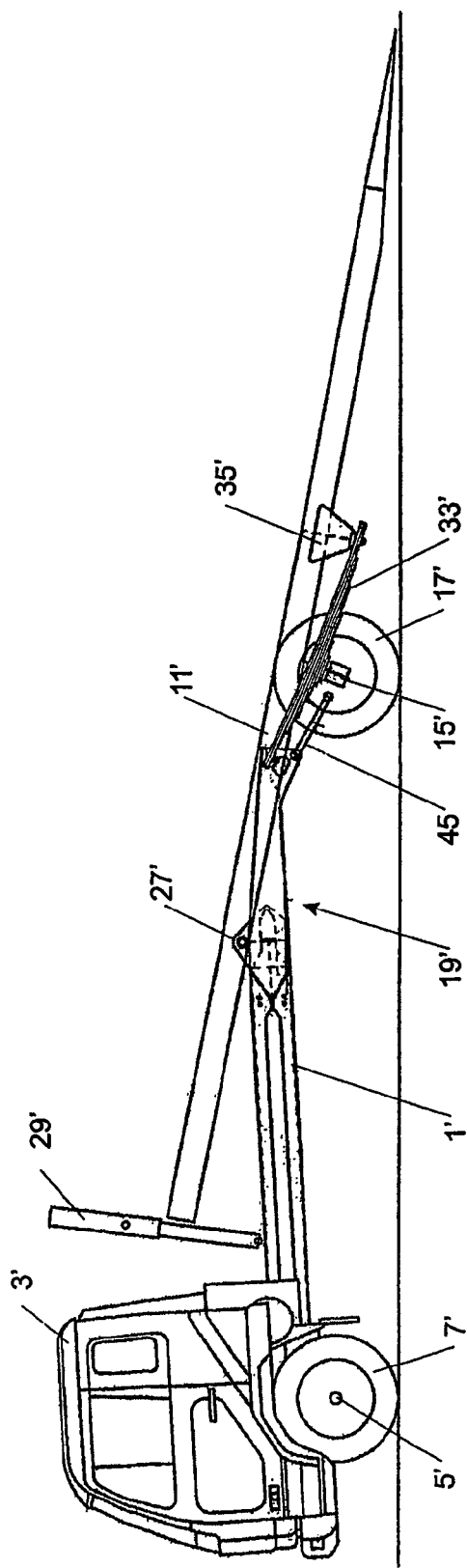
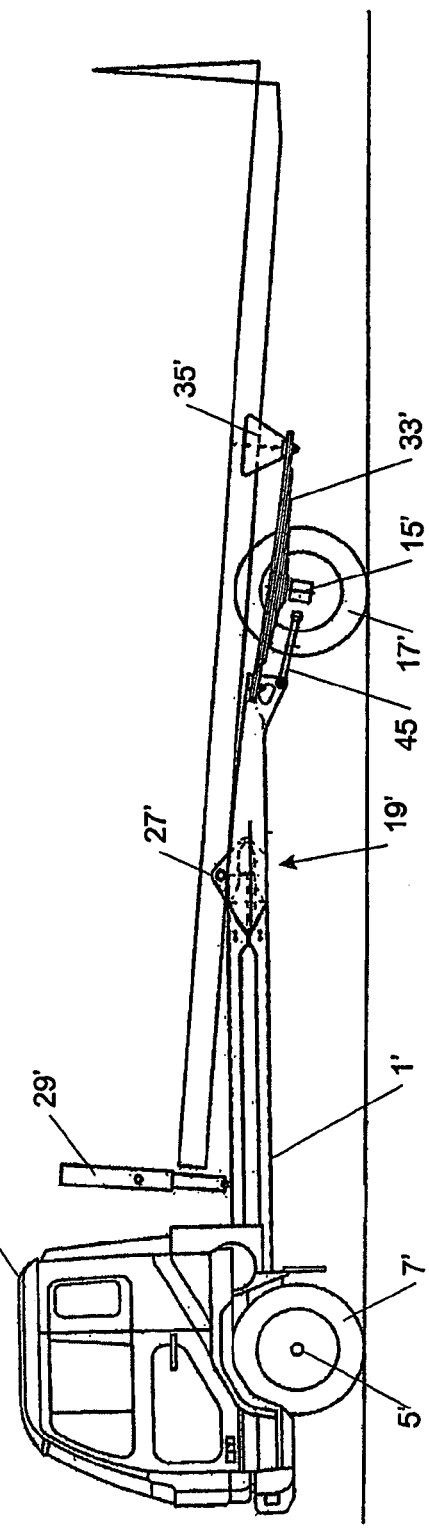
FIGURE 12a
FIGURE 12b

TRUCK WITH TILTING DECK

FIELD OF THE INVENTION

The invention relates to a truck with a tiltable deck which is suitable for carrying a load. While the truck is described with reference to carrying a vehicle, the principles are applicable to trucks for use in carrying other loads such as livestock or freight.

BACKGROUND

There are a number of existing vehicles with tiltable decks for carrying other vehicles or loads. Generally, the existing vehicles have a steep deck angle in the tilted configuration, which makes them difficult to load or unload. It is desirable to provide a relatively shallow loading angle so that the underside of a vehicle being loaded or unloaded will not scrape on the ground or the deck. Other vehicles may have a relatively shallow angle but either a very long deck or they require a large empty space behind the vehicle when loading or unloading.

U.S. Pat. No. 6,290,449 describes truck with a bed which is pivoted to the truck chassis towards the rear axle. A pair of wheel lifts is connected to the bed in order to lift a vehicle onto or off the truck due to the relatively steep loading angle of the bed. Generally, in order to provide a shallow loading angle on a truck of this kind, the bed needs to be very long, which reduces the maneuverability of the truck.

U.S. Pat. No. 4,770,592 describes a truck with a tilt-and-slide deck which slides rearwardly and tilts in order to load or unload a vehicle. While this arrangement provides a relatively shallow loading angle, a large amount of space is required behind the truck for loading or unloading.

U.S. Pat. No. 4,318,658 describes a truck with a split chassis such that the cab tilts forwardly as the deck tilts rearwardly. Whilst the truck provides a shallower deck angle than a conventional tilting deck with a rear pivot, the deck angle is still steeper than is desirable. Further, due to the stoppers hanging below the rear end of the deck, as the deck is tilted to the rearmost position, the stoppers will raise the deck off the ground.

U.S. Pat. No. 5,234,308 describes a trailer having a split bed which is hinged between its two axles. Whilst the rear end of the bed tilts towards the ground, in the tilted configuration there is a peak provided between the front and rear parts of the bed, which could cause a vehicle to "bottom out" on the peak during loading or unloading.

U.S. Pat. No. 5,051,053 and U.S. Pat. No. 4,730,974 describe load carrying trailers which provide shallow loading angles. That can be achieved in trailers by having the deck in a low and/or permanently-angled position between the wheels. However, such a configuration is generally not applicable to trucks, as they require greater strength and rigidity, as well as requiring additional room to accommodate the drive system including the drive shaft and differential.

Other load carrying vehicles are described in U.S. Pat. No. 4,929,142; U.S. Pat. No. 4,750,856; and U.S. Pat. No. 5,051,053.

It is an object of at least preferred embodiments of the present invention to provide a truck which ameliorates at least one of the disadvantages outlined above and/or which at least provides the public with a useful choice.

SUMMARY OF THE INVENTION

In accordance with a first aspect of the invention, there is provided a truck including: a chassis supporting a cab; and a deck which is supported at least by a rearmost axle and wheels; wherein the deck is tiltable relative to the chassis about a pivot axis located in front of the rearmost axle of the truck and arranged such that as the deck tilts rearwardly, the chassis tilts forwardly and the deck lowers towards the rearmost axle.

The chassis advantageously terminates forwardly of the rearmost axle.

The deck may be supported by a deck support frame which is pivotally connected to the chassis at the pivot axis. Alternatively, the deck may be pivotally connected to the chassis at the pivot axis.

The chassis suitably includes a pair of transversely extending arms which are pivotally connected to the deck or deck support frame to provide the pivoting connection between the deck and the chassis. The outwardly extending arms may be part of a chassis subframe member which forms a rearward part of the chassis.

Advantageously, the deck is supported on the rearmost axle by a suspension arrangement and a forward part of the suspension arrangement is operatively connected to the chassis, such that as the deck tilts the forward part of the suspension arrangement moves upwardly relative to the deck, thereby lowering the deck towards the rearmost axle. Said pivot axis may be positioned forwardly of said forward part of the suspension arrangement.

In one embodiment, the suspension arrangement may comprise leaf spring suspension. The leaf spring suspension may include a pair of spaced apart leaf springs, with the rear ends of the leaf springs operatively connected to the deck or deck support frame, and the front ends of the leaf springs operatively connected to the chassis, so that as the deck tilts the front ends of the leaf springs move upwardly relative to the deck, thereby lowering the deck towards the axle. The chassis preferably includes a pair of spring connectors for attachment to the front ends of respective leaf springs. The spring connectors are suitably carried by a chassis subframe member which forms a rearward part of the chassis.

Preferably, the deck includes a pair of apertures, shaped recesses or moveable covers which enable the front ends of the leaf springs and/or the spring connectors to extend above a lower part of the deck when the deck is tilted.

The suspension arrangement may include a pair of spaced apart leaf springs, with the front ends of the leaf springs operatively connected to the chassis, and the rear ends of the leaf springs operatively connected to the deck or deck support frame via respective air bags.

Preferably, the deck includes a pair of apertures, shaped recesses or moveable covers which enable upper edges of the wheels to extend above a lower part of the deck when the deck is tilted.

The truck suitably includes an engine supported by the chassis, a driveshaft to transmit motive power from the engine and which extends rearwardly from the engine, and a differential to transmit motion from the driveshaft to the wheels carried by the rearmost axle, wherein the driveshaft includes a pivot to accommodate changes in angle between the driveshaft and differential as the deck is tilted.

The truck may include a ramp at or towards the rear end of the deck and which is moveable from a storage position to a loading/unloading position to enable ease of loading and unloading of vehicles or goods onto and off the deck. Preferably, the ramp is configured to automatically move to the loading/unloading position as the deck it tilted, and to automatically move to the storage position as the deck is returned from a tilted position.

The ramp may be pivotally connected to the deck or deck support frame. Advantageously, the ramp is foldable across its width, and as configured to automatically fold in the storage position and unfold in the loading/unloading position.

In accordance with a second aspect of the invention, there is provided a truck including: a chassis supporting a cab; and a deck which is supported on a rearmost axle and wheels by a suspension arrangement, with a forward part of the suspension arrangement operatively connected to the chassis and a rear part of the suspension arrangement operatively connected to the deck, wherein the deck is tiltable relative to the chassis about a pivot axis located in front of the rearmost axle of the truck and in front of said forward part of the suspension arrangement and arranged such that as the deck tilts rearwardly, the chassis tilts forwardly and said forward part of the suspension arrangement moves upwardly relative to the deck, thereby lowering the deck towards the rearmost axle.

BRIEF DESCRIPTION OF THE DRAWINGS

Preferred embodiments of the invention will be described, by way of example only, with reference to the accompanying figures in which.

DETAILED DESCRIPTION OF PREFERRED FORMS

Figure 1:
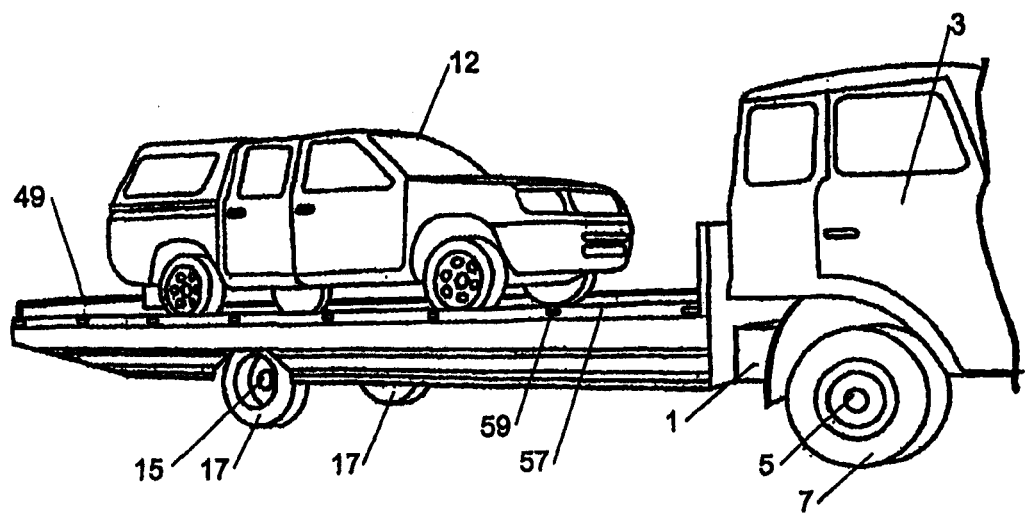
Figure 2:
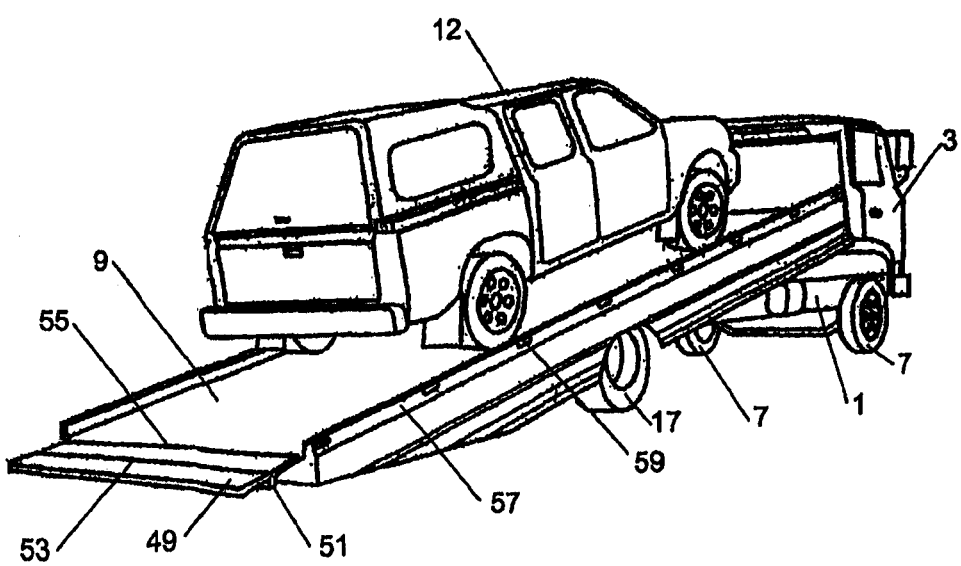
Figure 3:
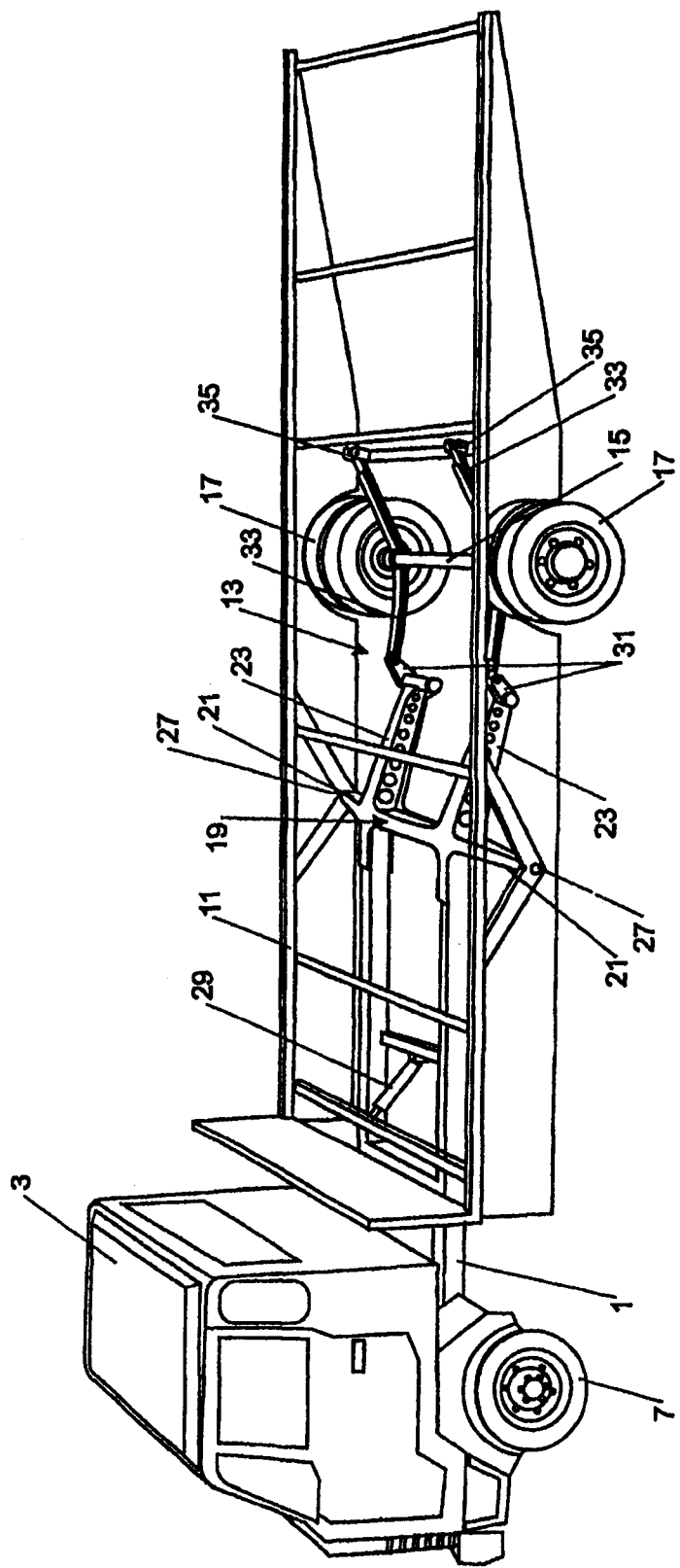

FIGS. 1 to 4 show a preferred embodiment truck, which includes a chassis 1 supporting a cab 3, with the chassis 1 supported by a front axle 5 and wheels 7. The rear part of the truck includes a tiltable deck 9 carried by a deck support frame 11 (FIG. 3). The deck is configured for receipt of a vehicle 12 to be carried by the truck. The deck support frame 11 is supported on a suspension arrangement 13 from a rearmost axle 15 and wheels 17. The chassis 1 terminates forwardly of the rearmost axle 15. As can be seen generally from FIGS. 1 and 2, as the deck tilts rearwardly, the chassis and cab tilt forwardly.

Figure 4:
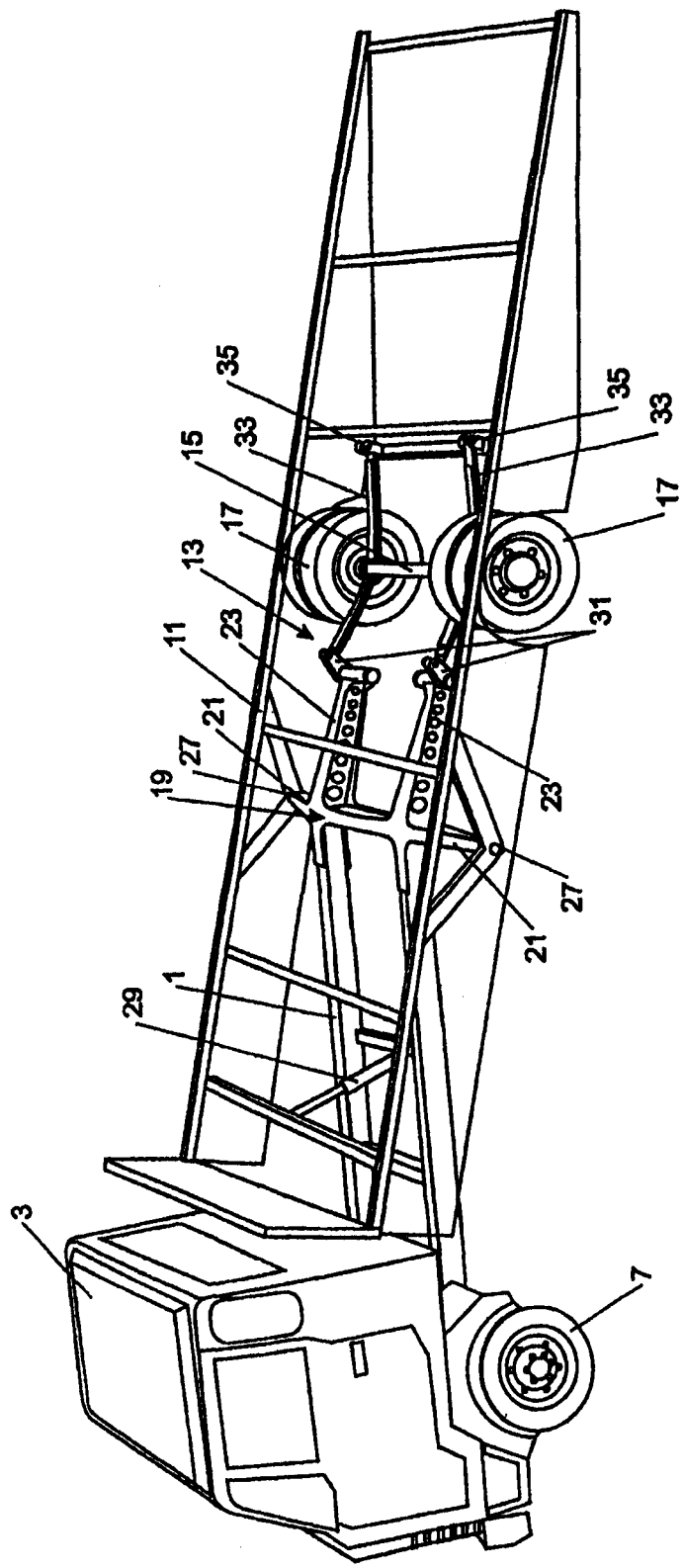
Figure 1:
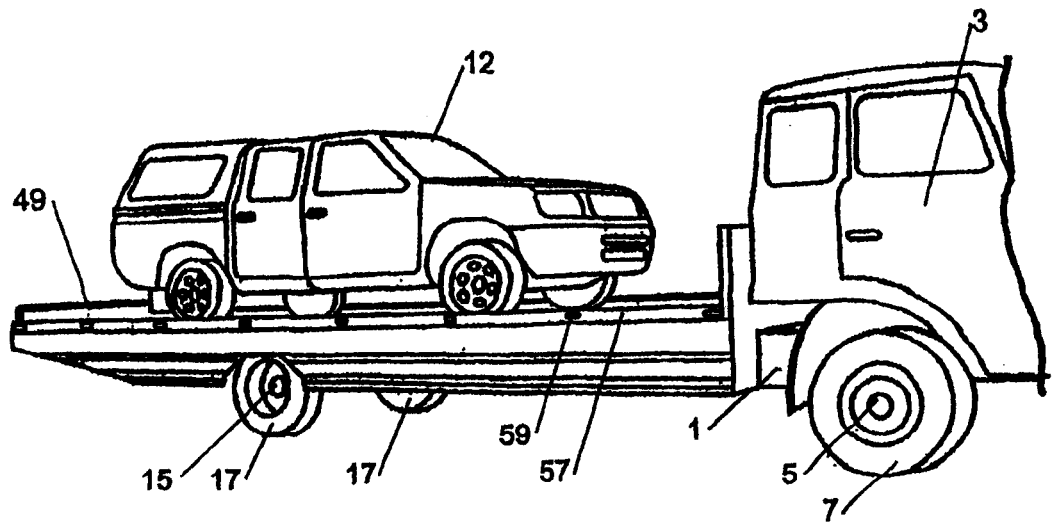
Figure 2:
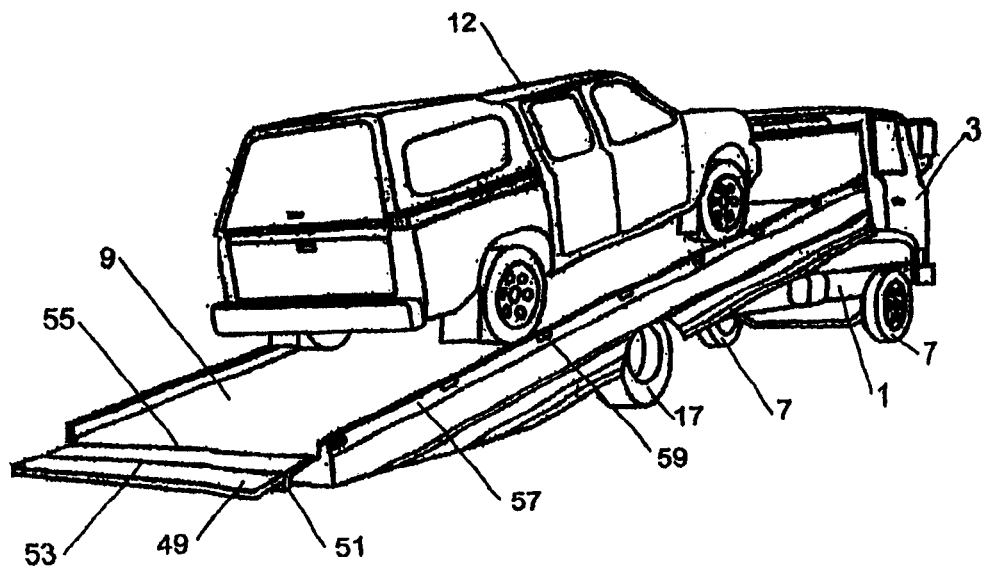
Figure 3:
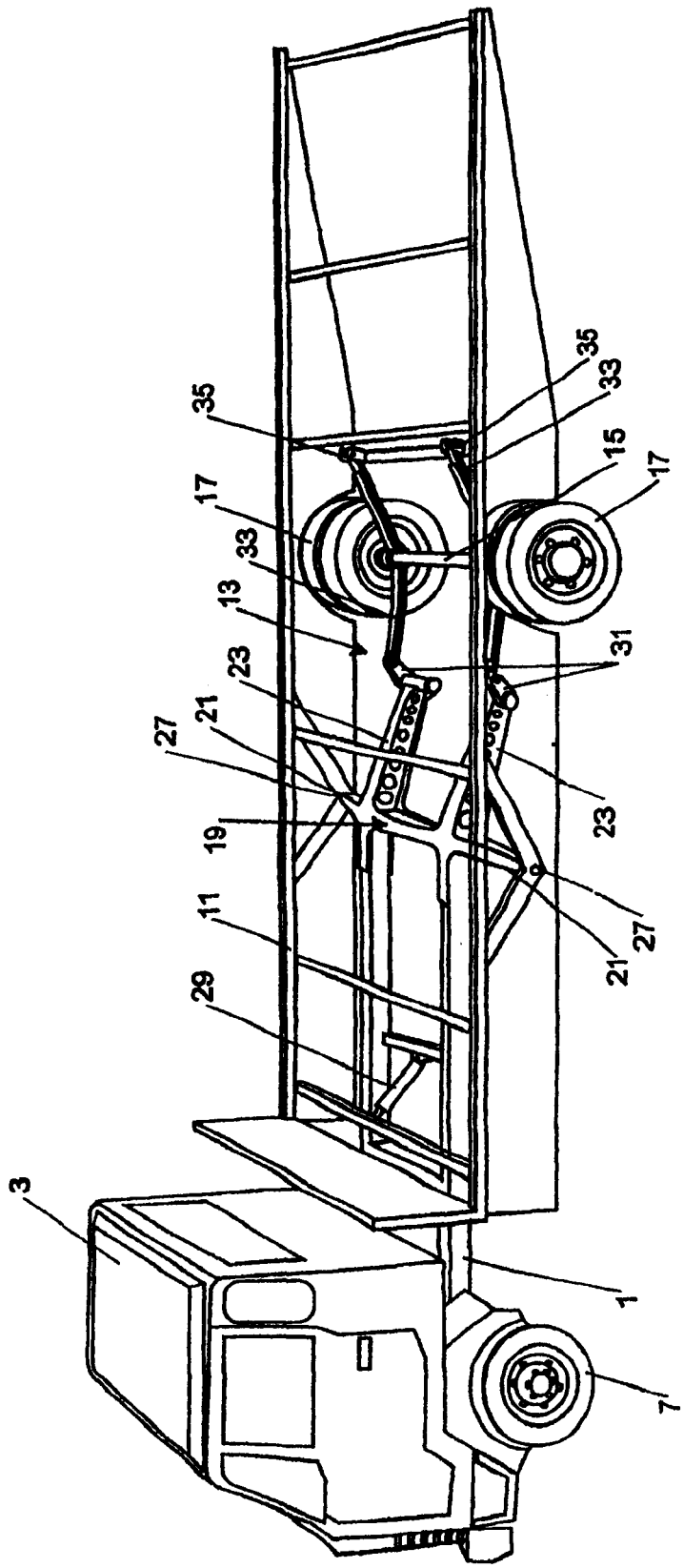
Figure 4:
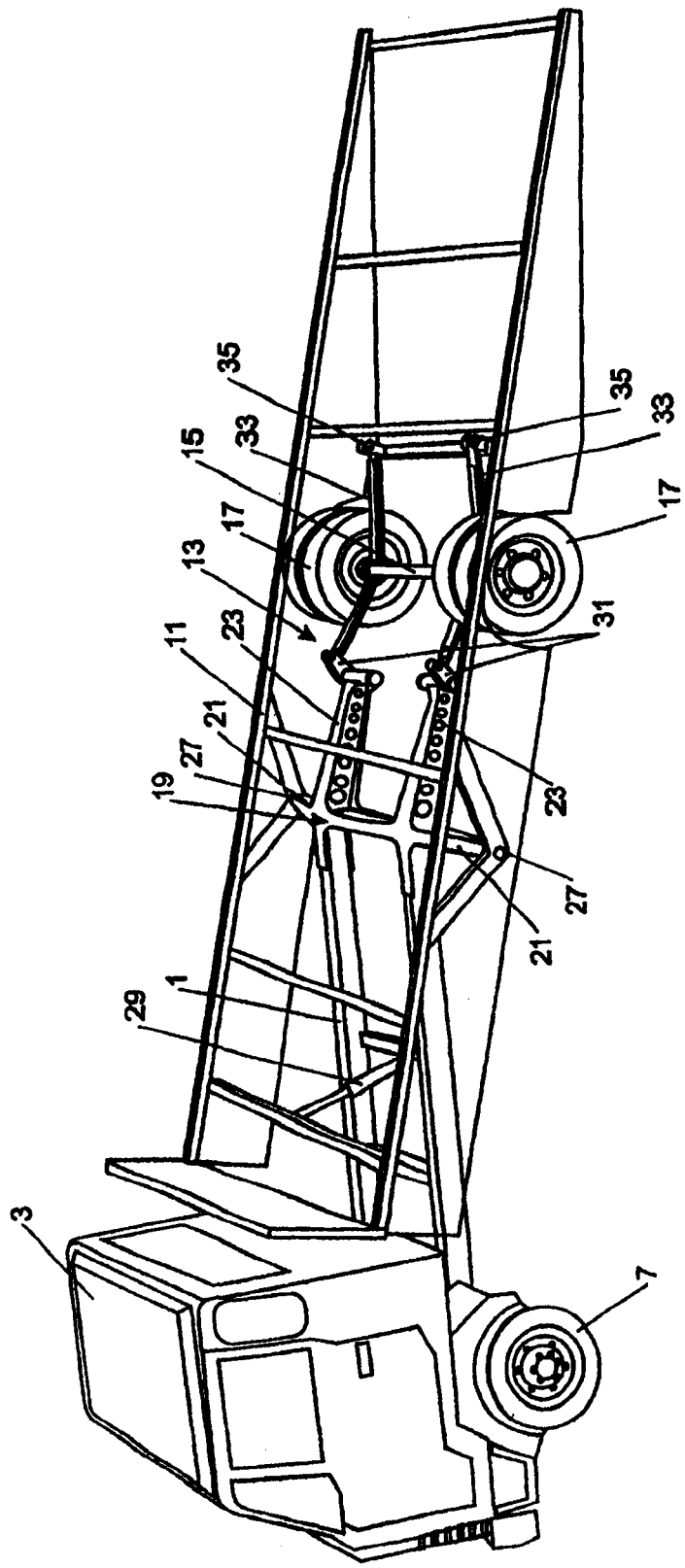
Figure 5A:
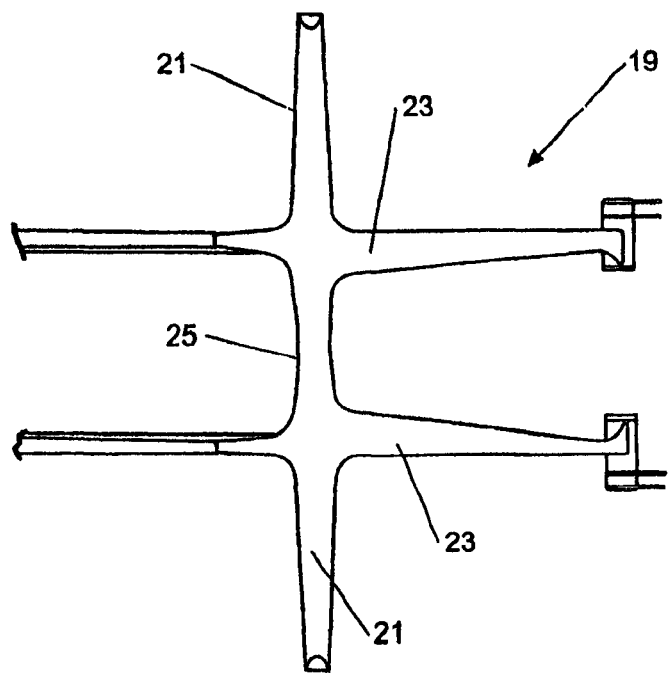
Figure 5B:
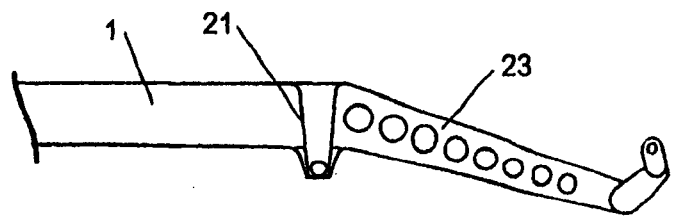
Figure 5C:
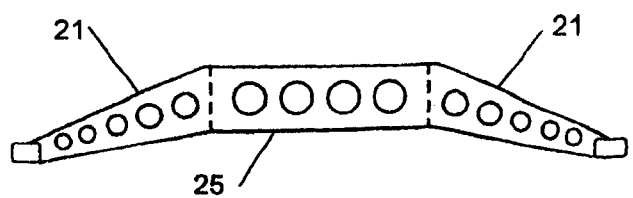
Figure 6:
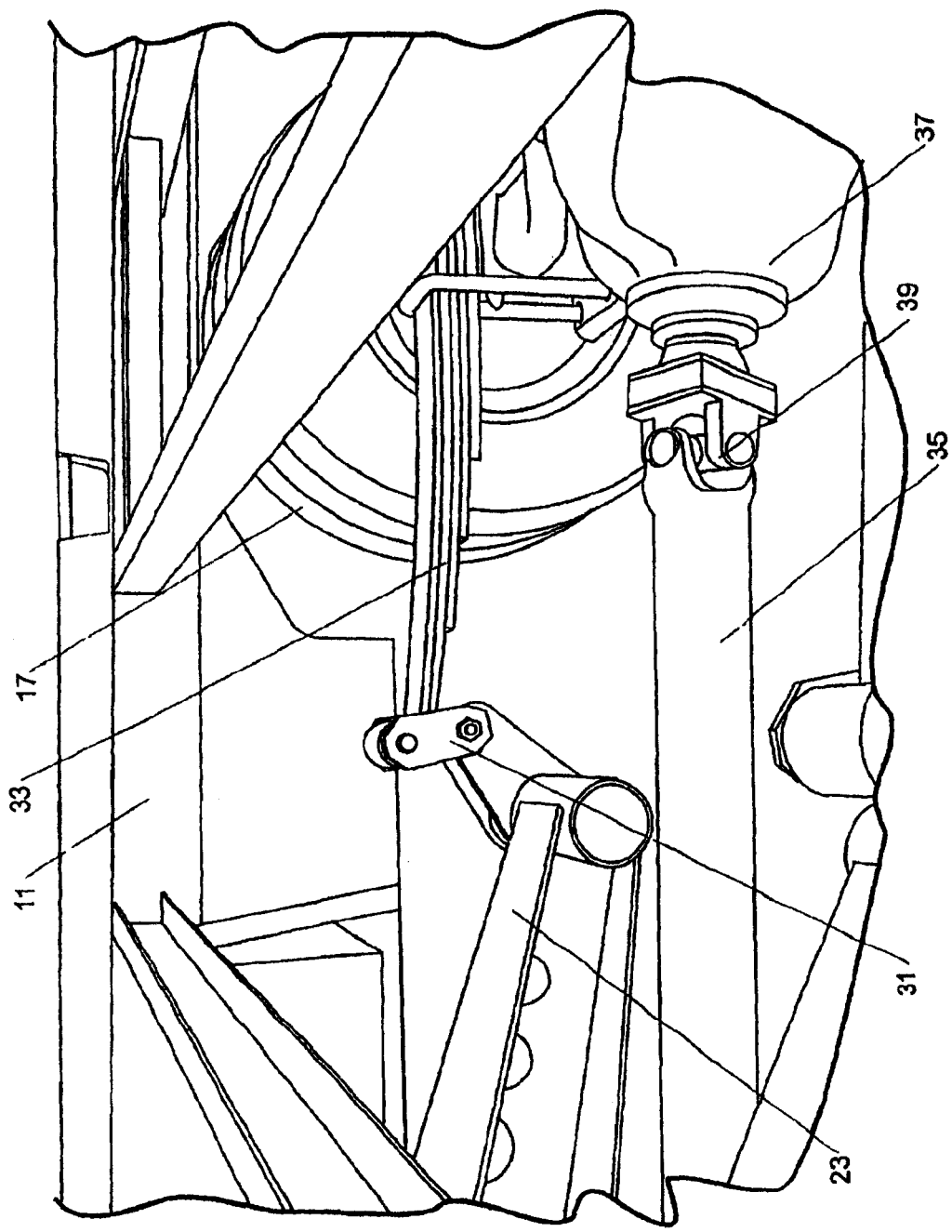
Figure 8:
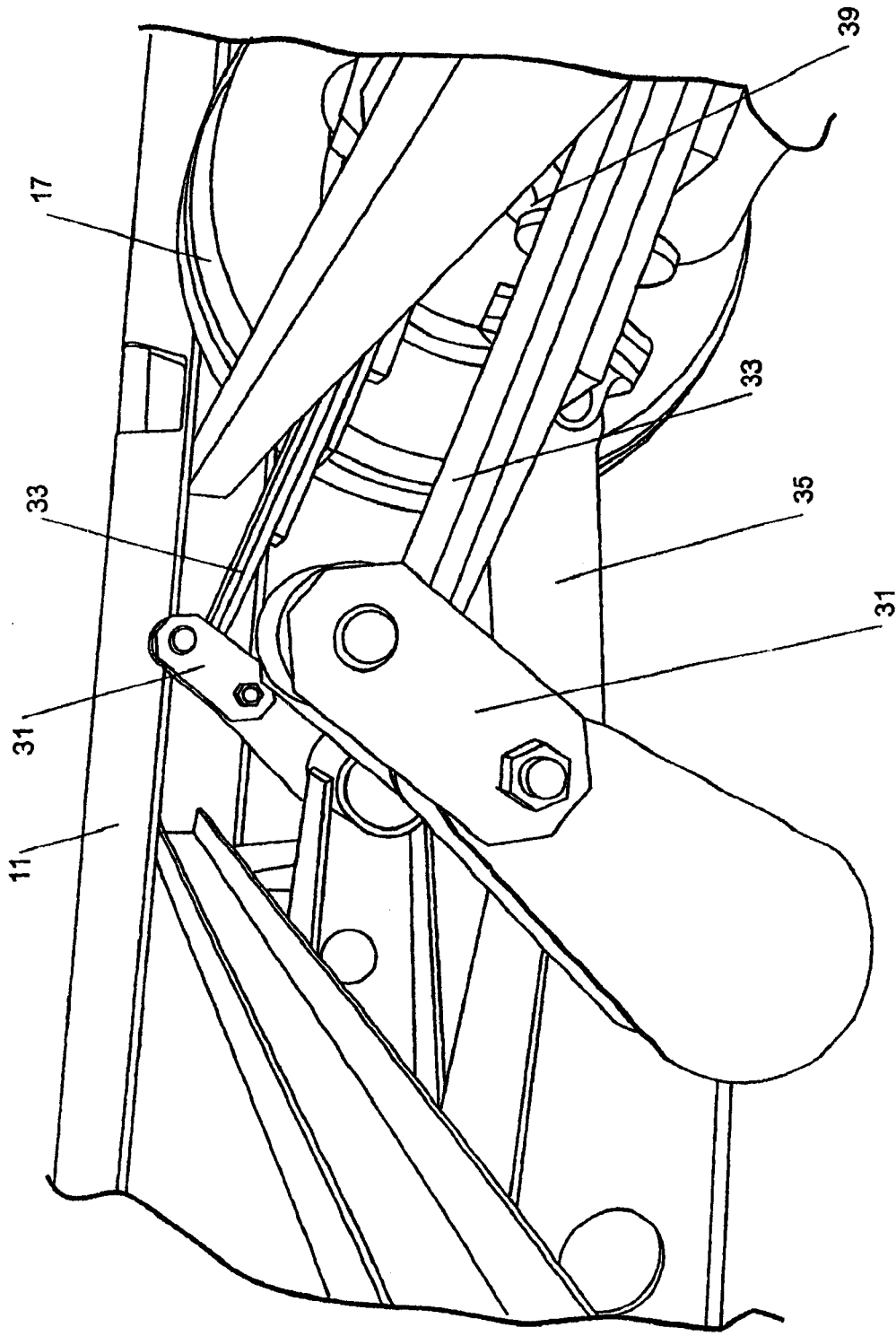
Figure 9:
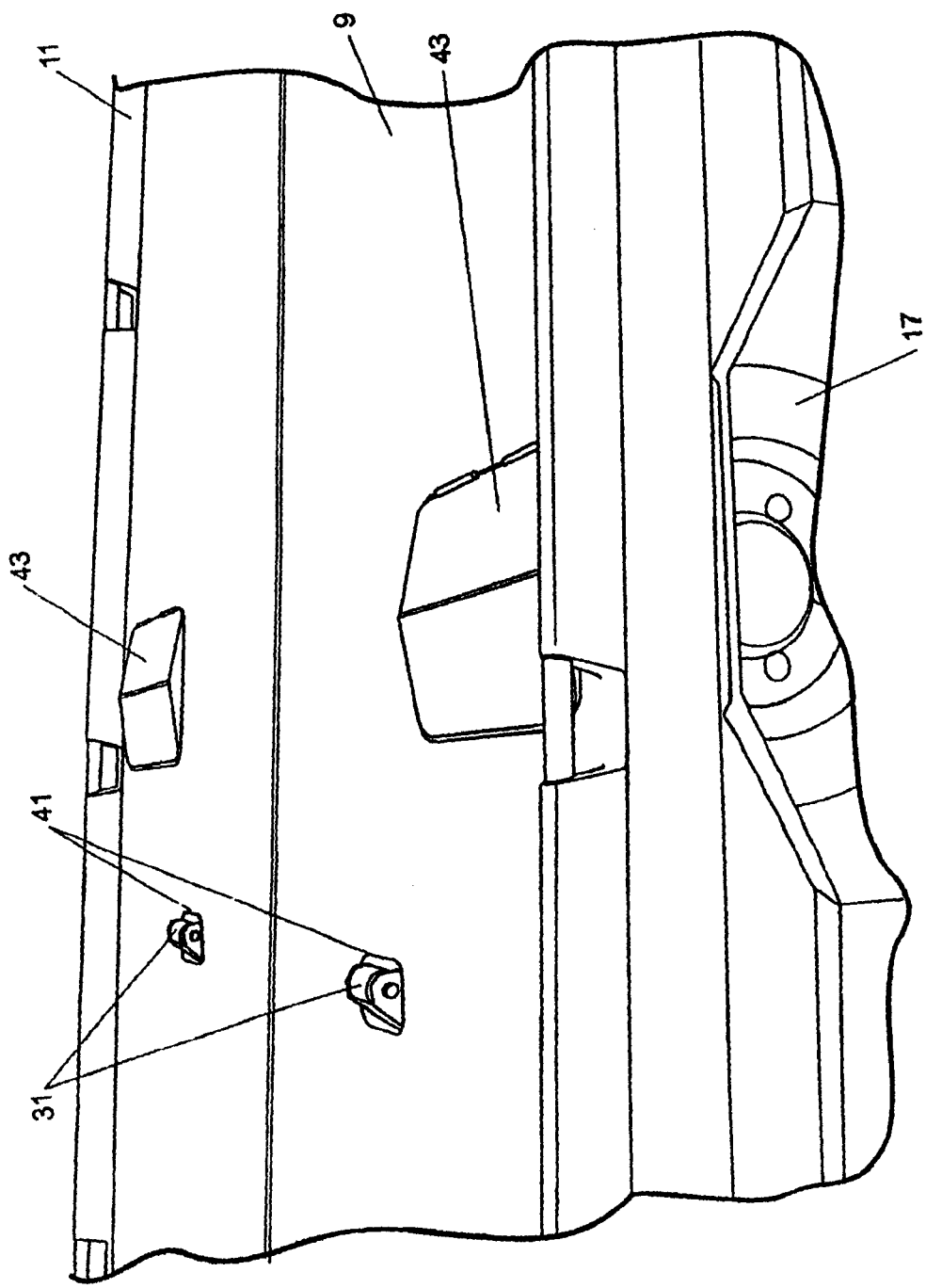
Figure 10:
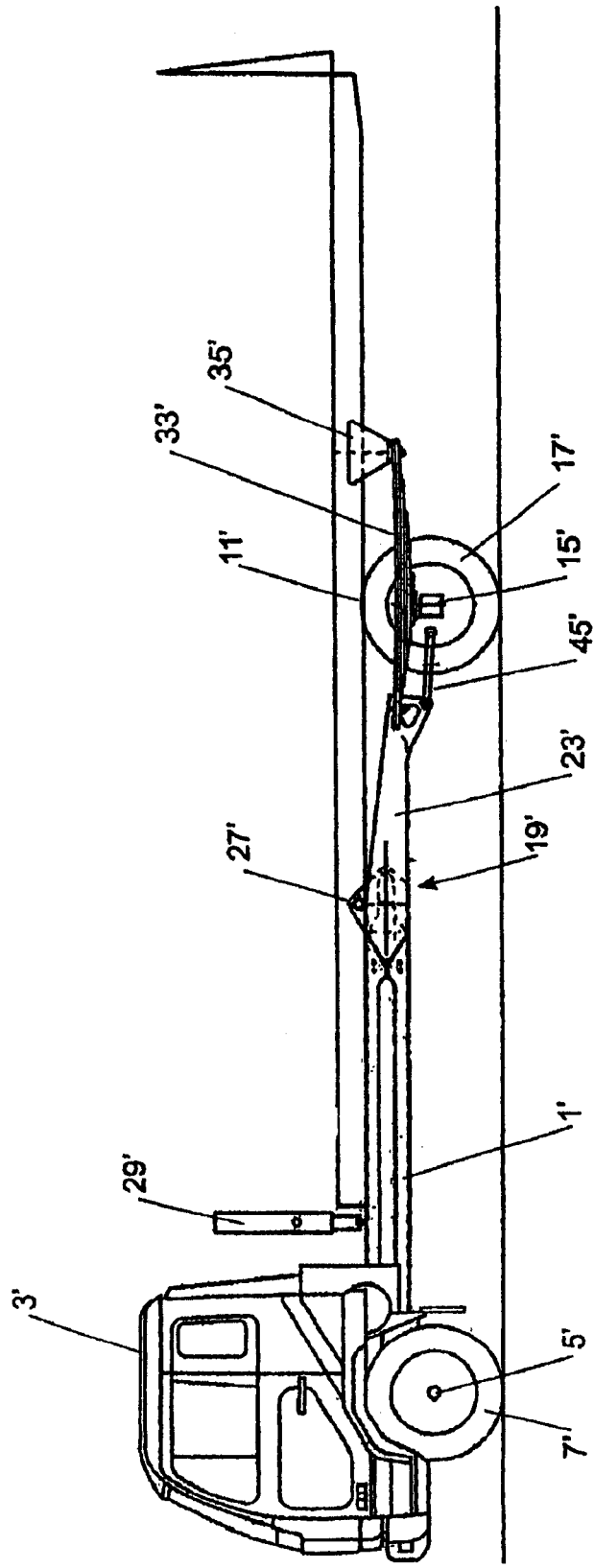
Figure 11:
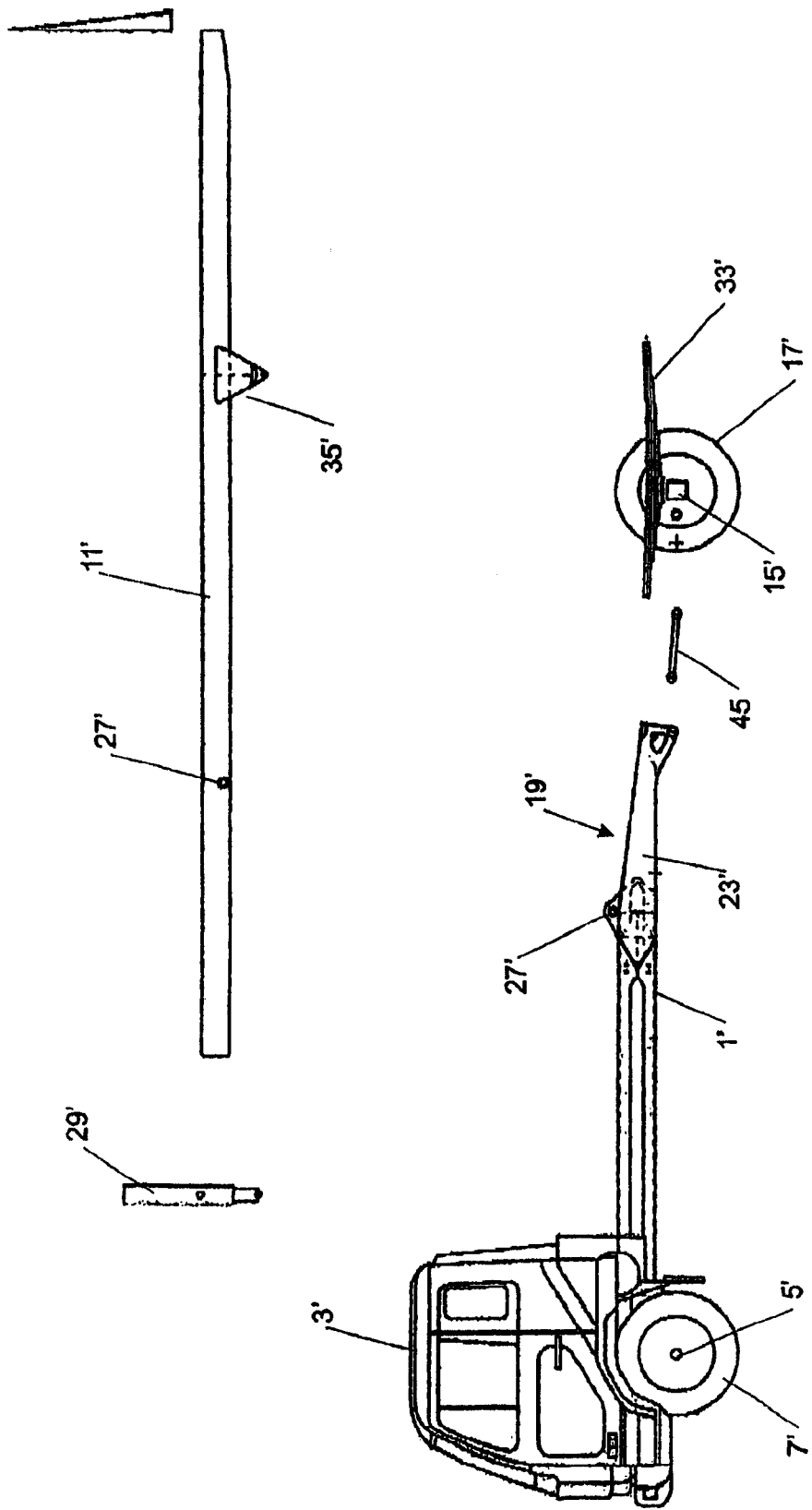
Figure 12A:
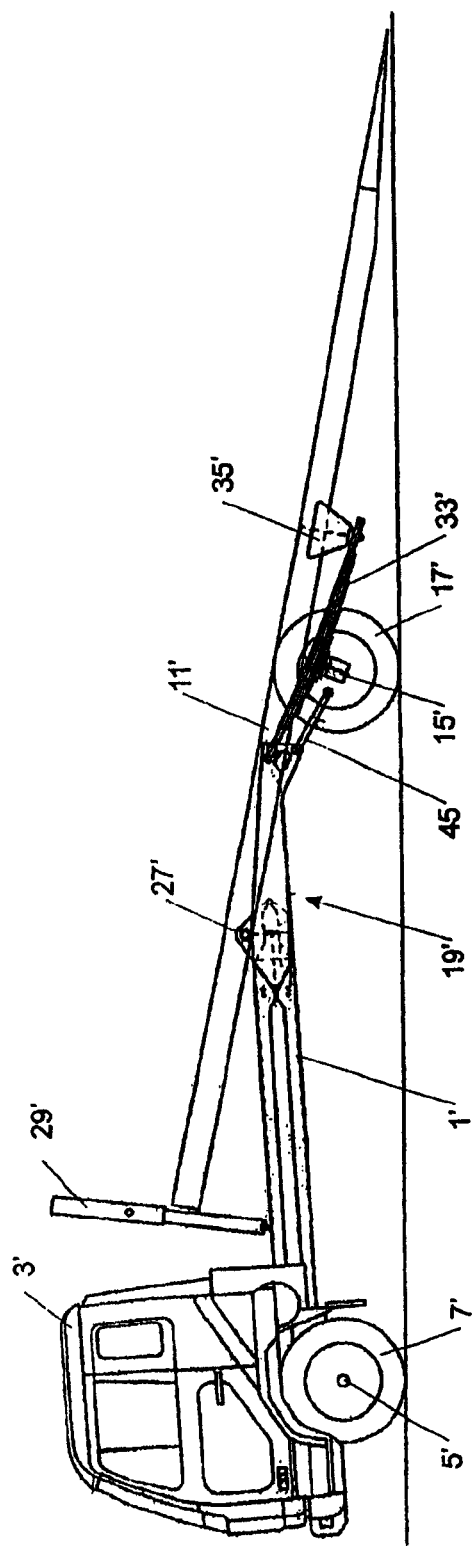
Figure 12B:
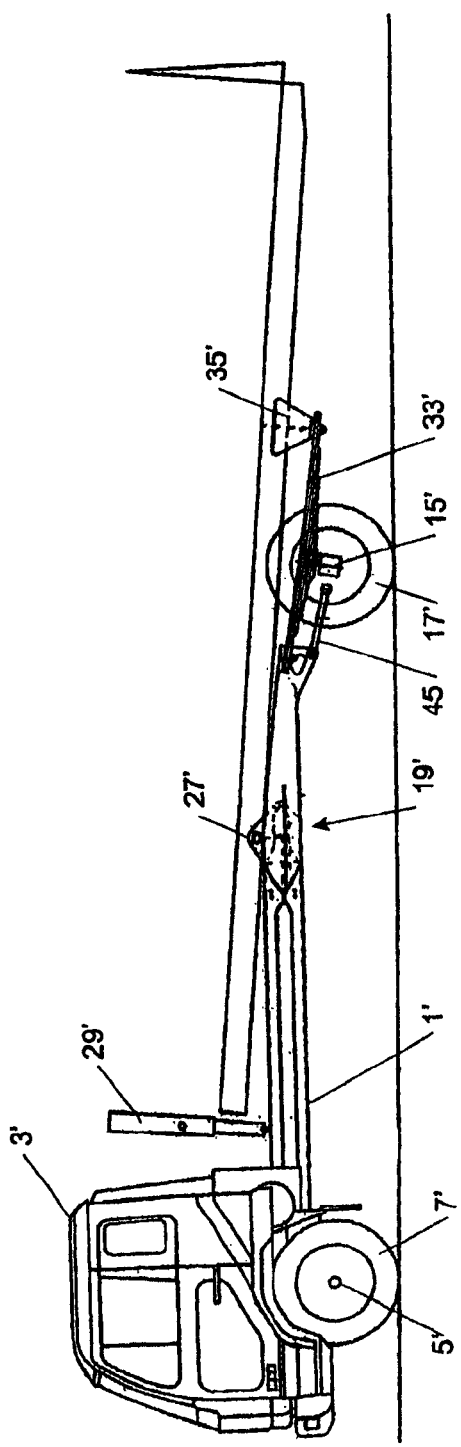
Figure 12C:
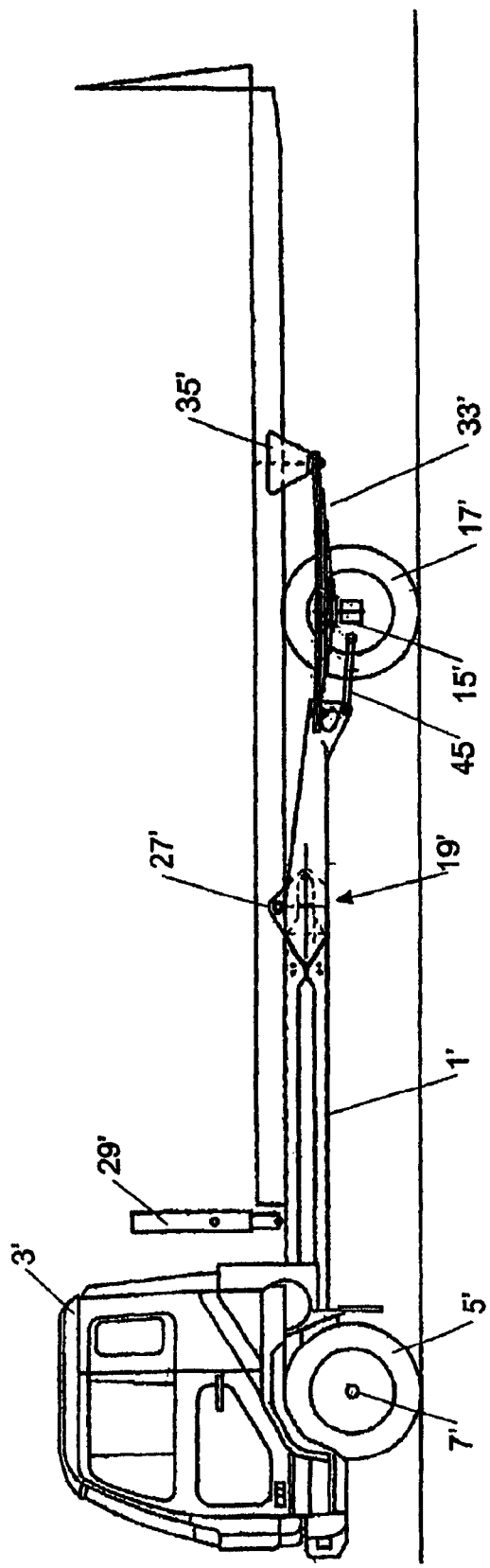
Figure 13:
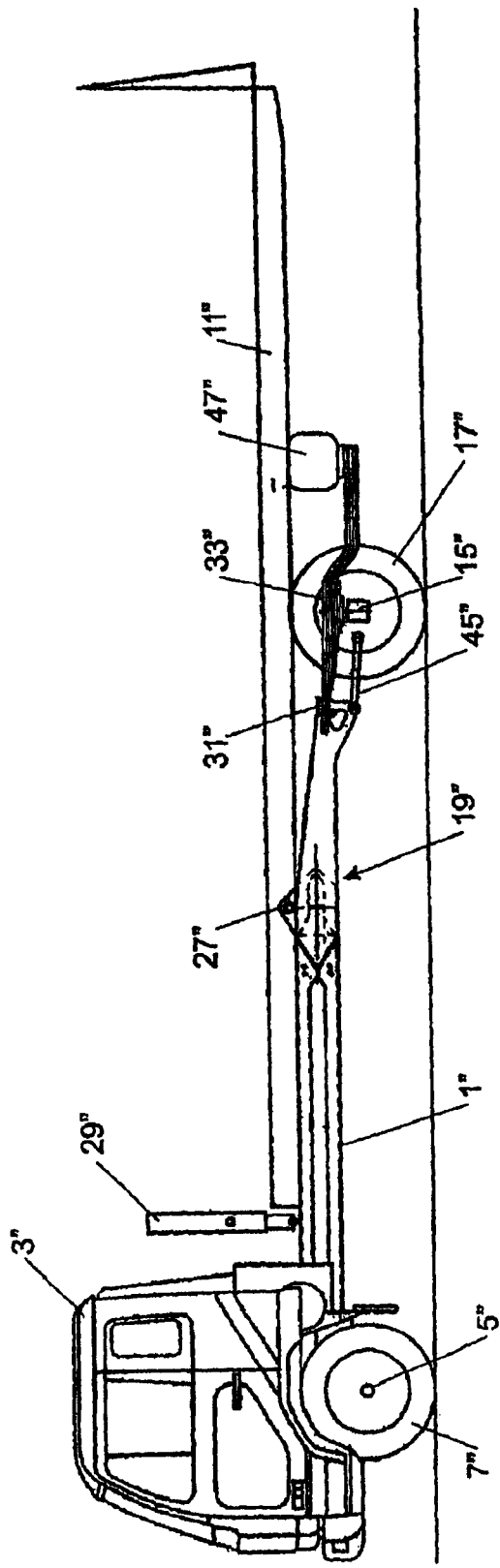
Figure 14:
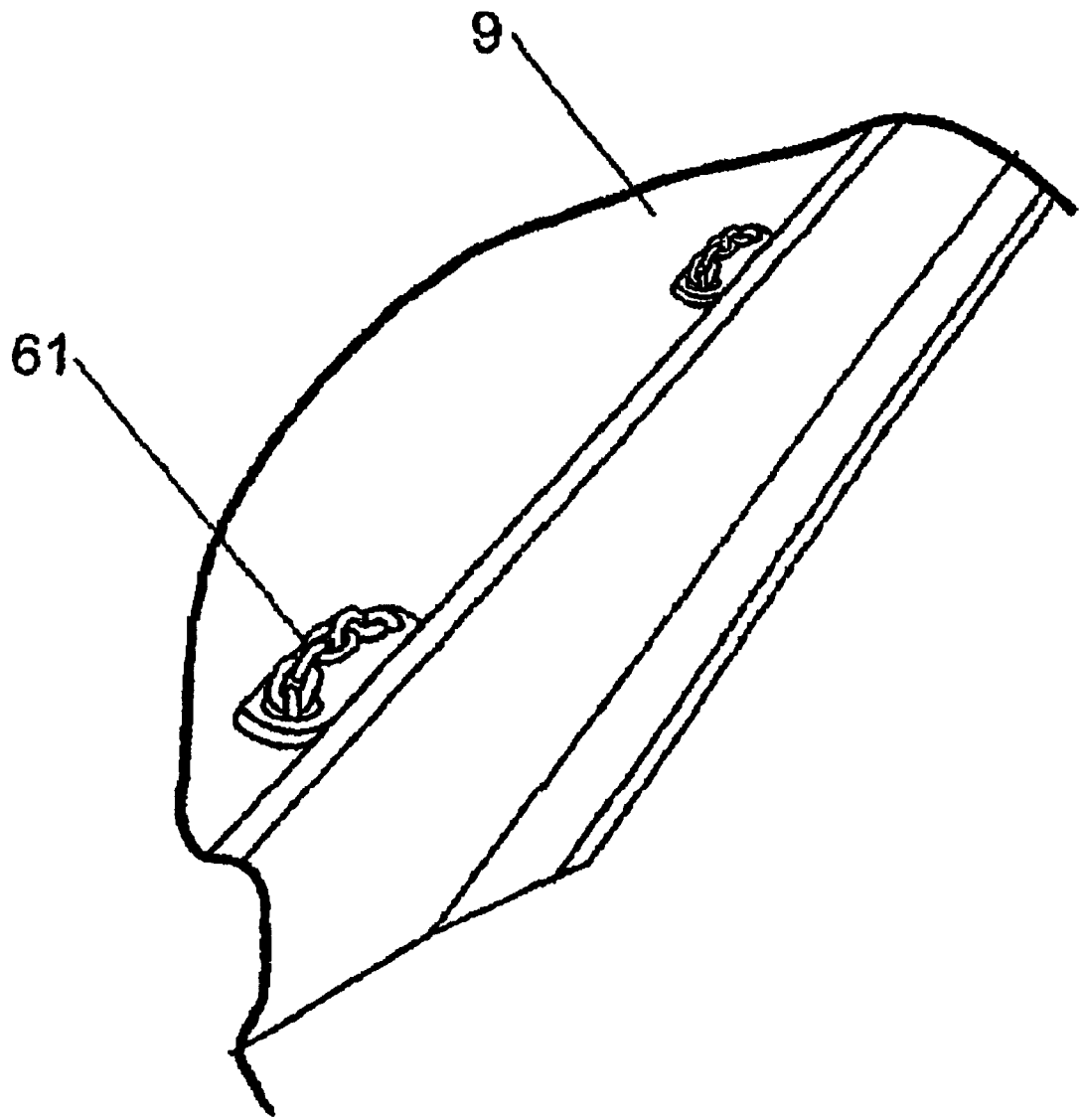

FIGS. 3 and 4 show the truck with the deck skin removed. As can be seen from these Figures, the chassis terminates in a chassis subframe 19 which is shown in more detail in FIG. 5. The subframe 19 includes a pair of outwardly extending arms 21, and a pair of rearwardly extending arms 23. The outwardly and rearwardly extending arms 21, 23 are interconnected by a cross-member 25. The chassis subframe 19 is generally attached to the chassis 1 via bolts, welds, or the like, and enables an existing truck to be retrofitted with the tilting arrangement of the present invention. However, the arms 21, 23 could be formed as an integral part of the chassis 1, such as by casting, if the tilting arrangement is to be provided as part of a new truck on the production line.

The outwardly extending arms 21 are pivotally connected to the deck support frame 11 at pivot points 27 which define a pivot axis forwardly of the rearmost axle 15 and forwardly of the front connection of the suspension arrangement 13. This pivoting interconnection results in the chassis 1 tilting forwardly as the deck tilts rearwardly. As the pivot axis between the chassis subframe 19 and the deck support frame 11 is located in front of the rearmost axle, a relatively shallow angle of incline of the deck 9 is provided for loading or unloading vehicles.

As shown in FIGS. 3 and 4, a tilt actuator in the form of a hydraulic ram 29 is connected at one end to the chassis 1 and at the other end to the deck support frame 11. Upon actuation of the hydraulic ram, the cab 3 and chassis 1 tilt in a forward direction and the deck support frame 11 and deck 9 tilt in a rearward direction, and the chassis 1 and deck support frame 11 pivot relative to one another about the pivot axis through the pivot points 27.

In the embodiment shown, the rear ends of the rearwardly extending arms 23 terminate in a pair of spring connectors 31 for receipt of the front ends of leaf springs 33 from the suspension arrangement 13. The leaf springs extend rearwardly to support the rearmost axle, and are connected to the deck support frame 11 by spring connectors 35. In the embodiment shown, the spring connectors 31, 35 are spring eyes or hangers. Other types of connectors could be used, such as slippers, which will be described below with reference to the embodiment of FIGS. 10 to 12.

As can be seen from FIGS. 3 and 4, as the hydraulic ram 29 is actuated to tilt the deck support frame 11 and deck 9, the deck support frame 11 tilts rearwardly and the chassis 1 tilts forwardly about the pivot axis through points 27. Due to the connection of the front ends of the springs 33 to the rear ends of the rearwardly extending chassis arms 23 (via spring connectors 31) and the position of the pivot axis in front of the spring connectors 31, as the deck tilts rearwardly and the chassis tilts forwardly, the front ends of the springs 33 are pulled upwardly relative to the deck and the deck support frame 11 and deck 9 lower in height relative to the rearmost axle 15 and wheels 17. The overall effect is that the deck, when tilted into the loading/unloading position, has a shallow angle of incline of about 10 degrees. As the deck support frame 11 is returned to the transport configuration shown in FIG. 3, the front ends of the springs lower away from the deck 9, thereby raising the deck above the rearmost axle 15 and wheels 17.

Figure 1A:
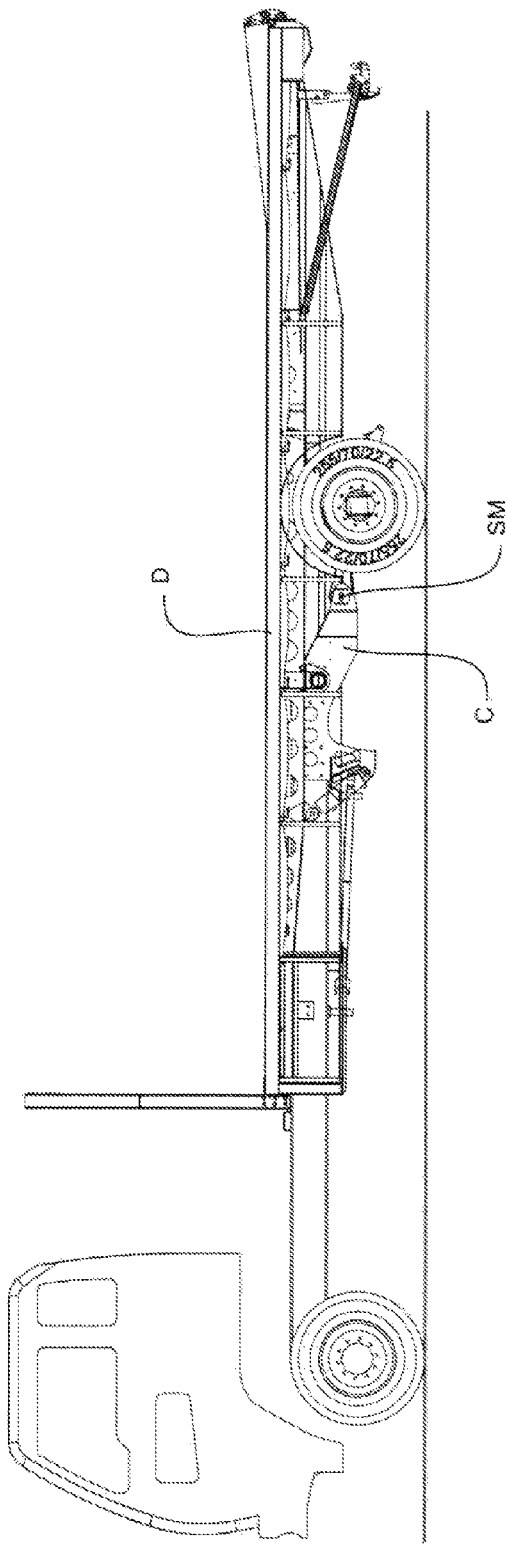
FIG. 1 is a perspective view of a preferred embodiment truck, having a deck upon which a vehicle is positioned for transportation.
Figure 1B:
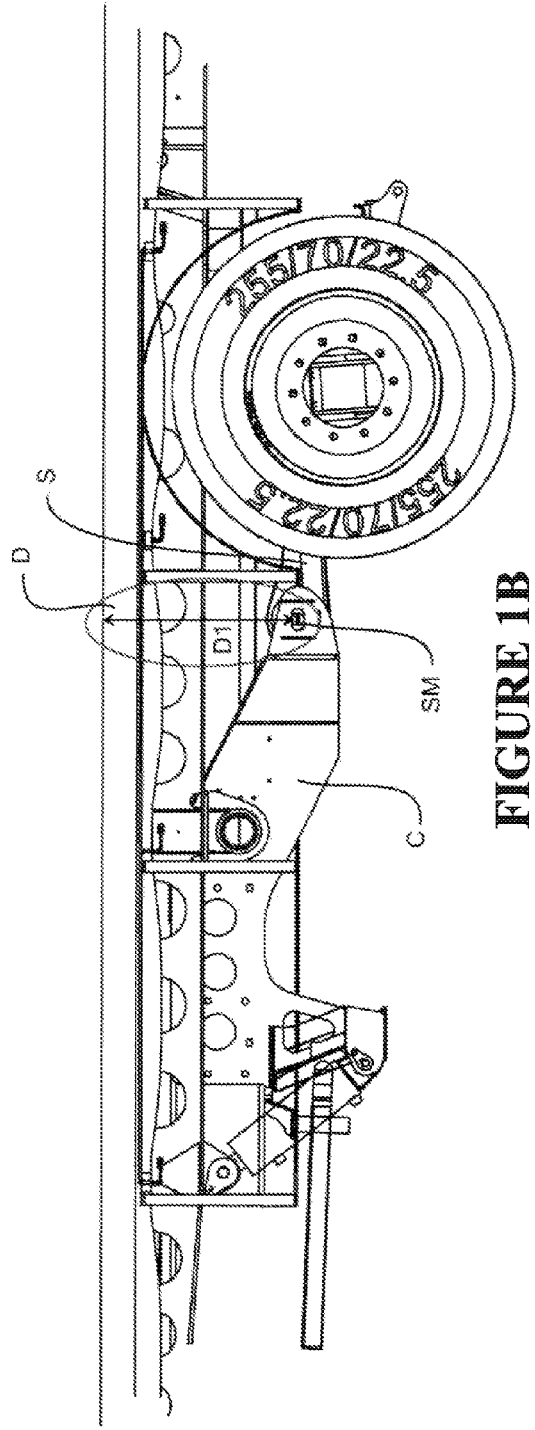
Figure 2A:
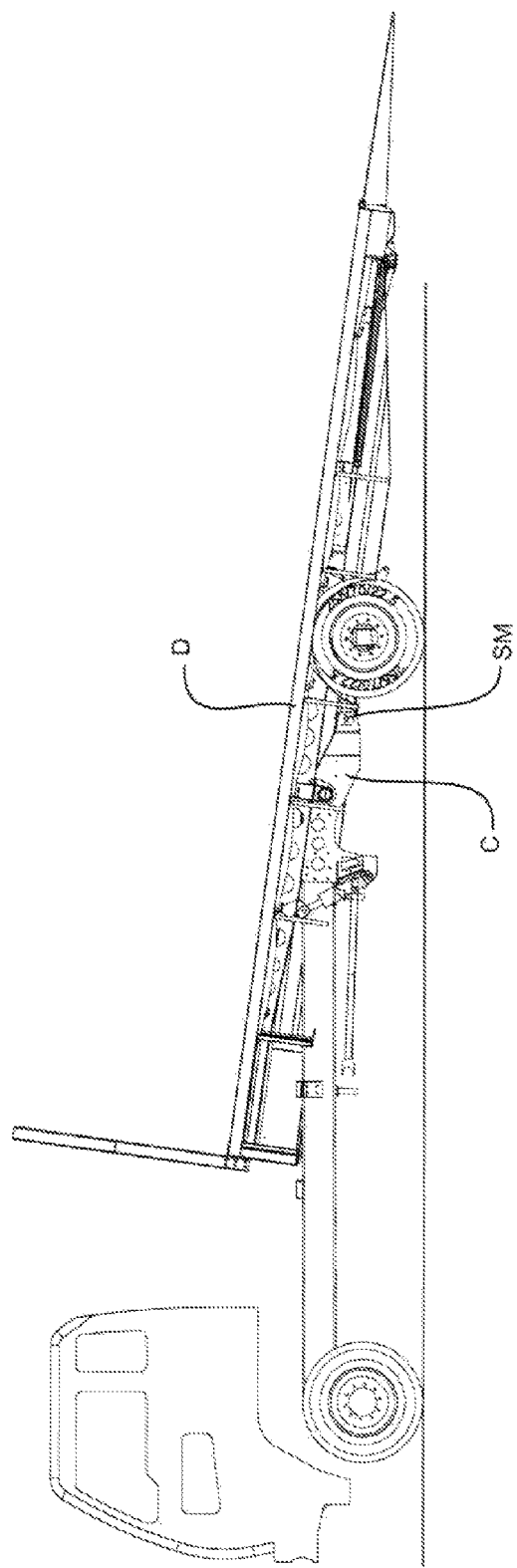
FIG. 2 is a rear perspective view of the truck of FIG. 1, with the deck in a tilted position for loading or unloading of the vehicle onto or off the truck deck.
Figure 2B:
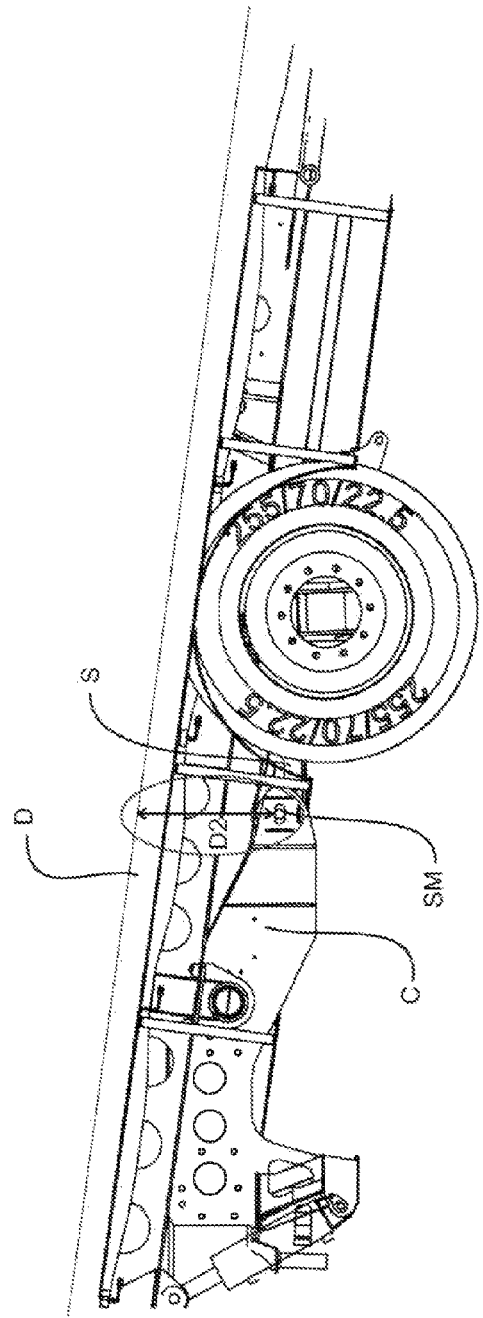
Figure 3A:
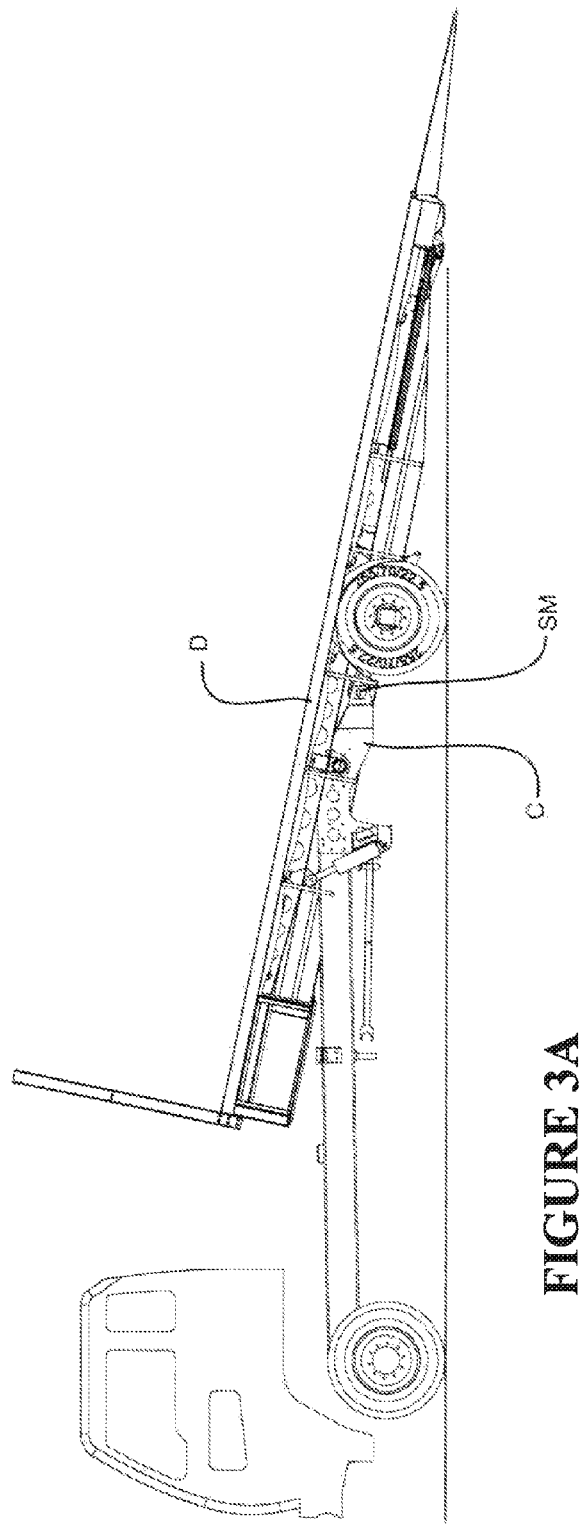
FIG. 3 is a view of the truck of FIG. 1 with the deck removed, in a transportation configuration.
Figure 3B:
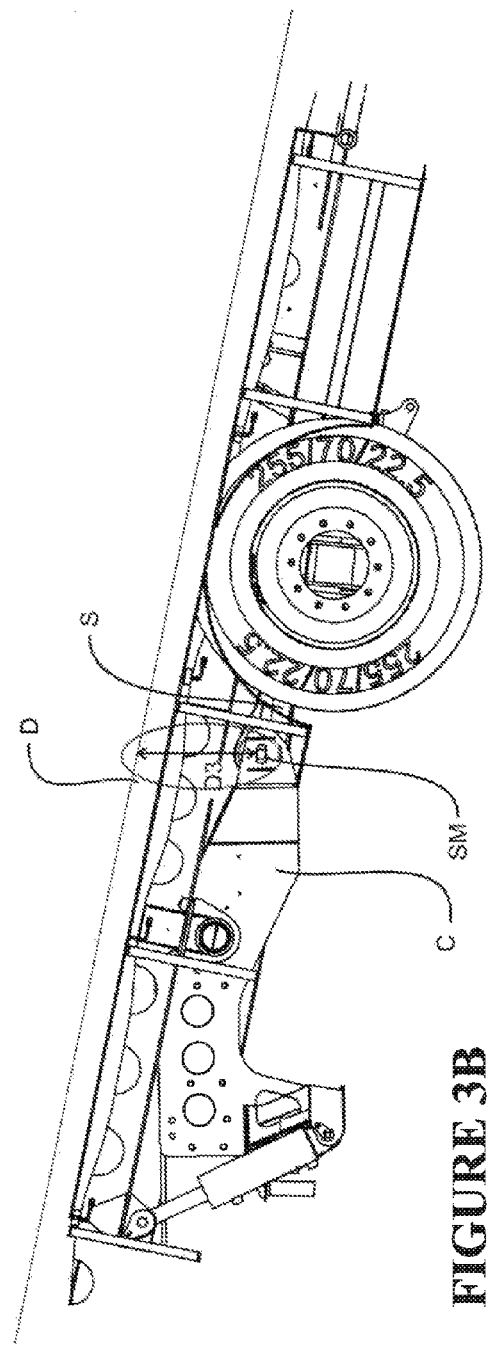
Figure 4A:
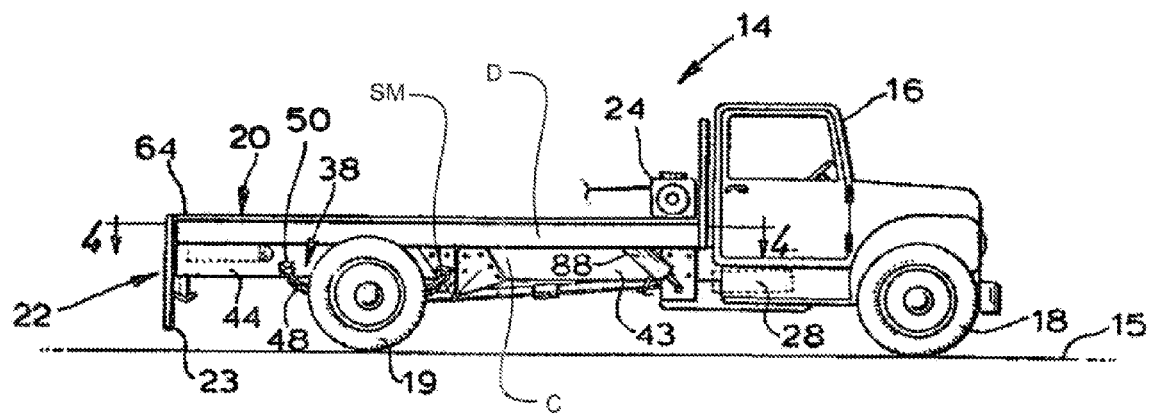
FIG. 4 is a view similar to FIG. 3, showing the truck in a loading/unloading configuration.
Figure 4B:
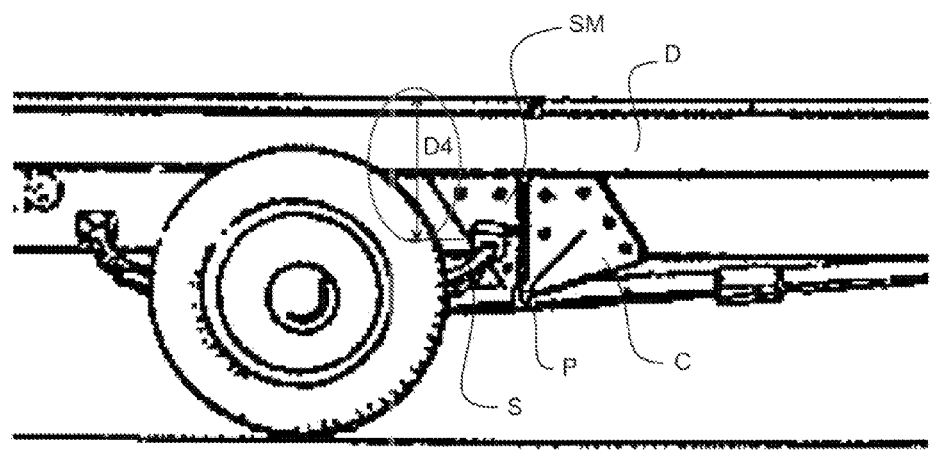
Figure 5A:
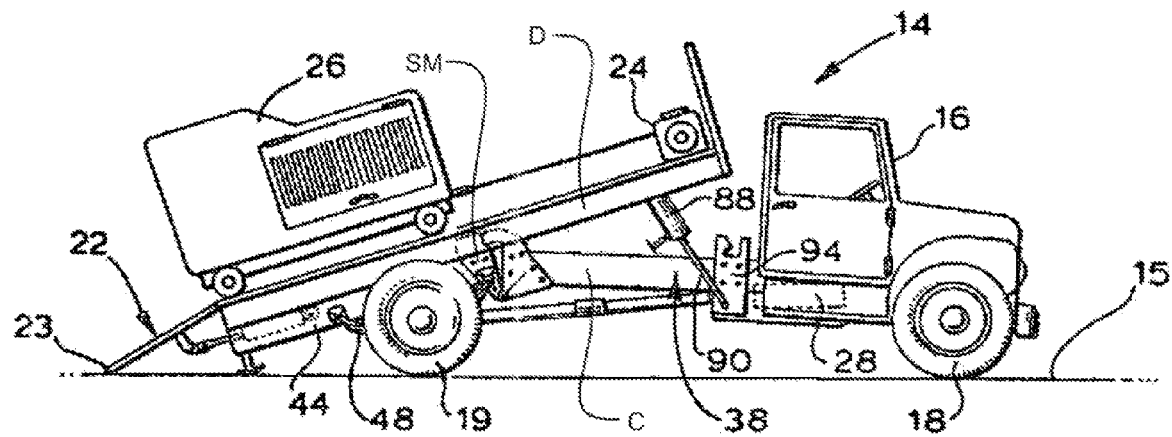
FIGS. 5a, 5b and 5c show a plan, side elevation, and rear sectional view respectively of a chassis subframe member.
Figure 5B:
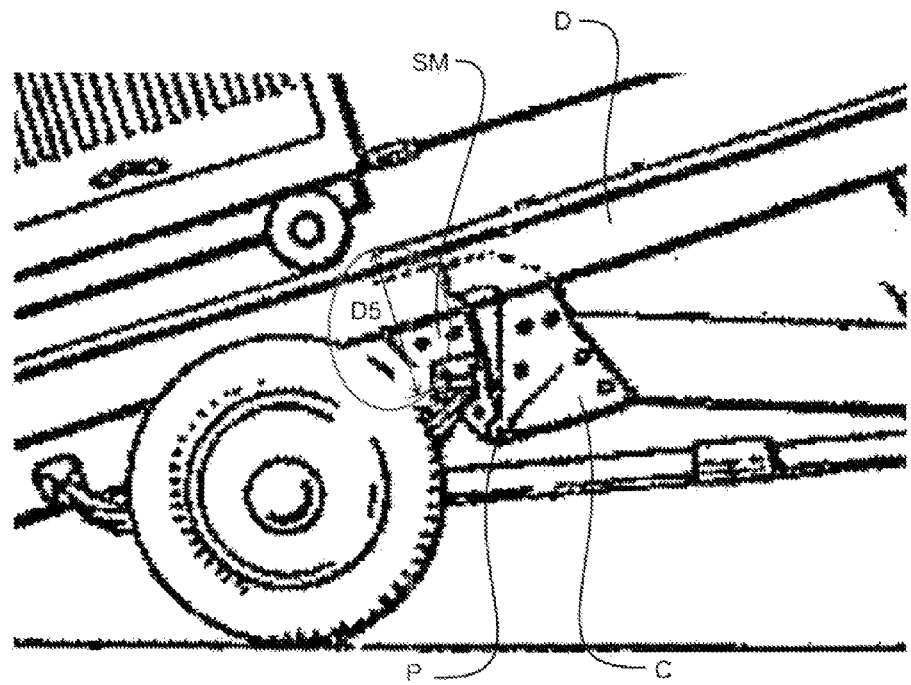
Figure 5A:
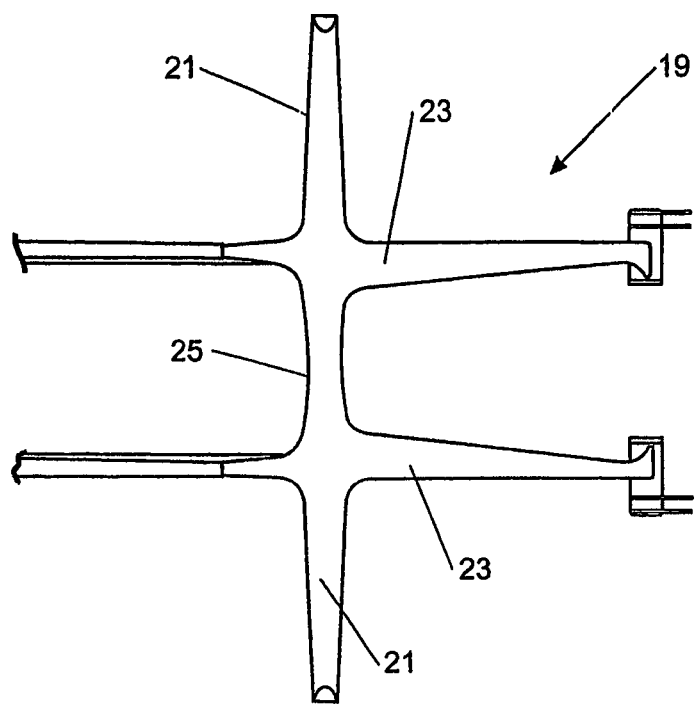
Figure 5B:
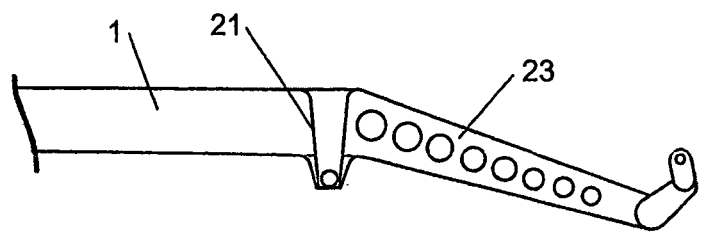
Figure 5C:
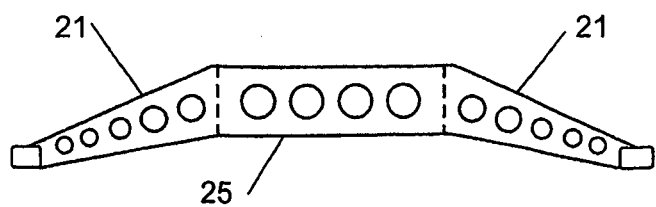
Figure 6:
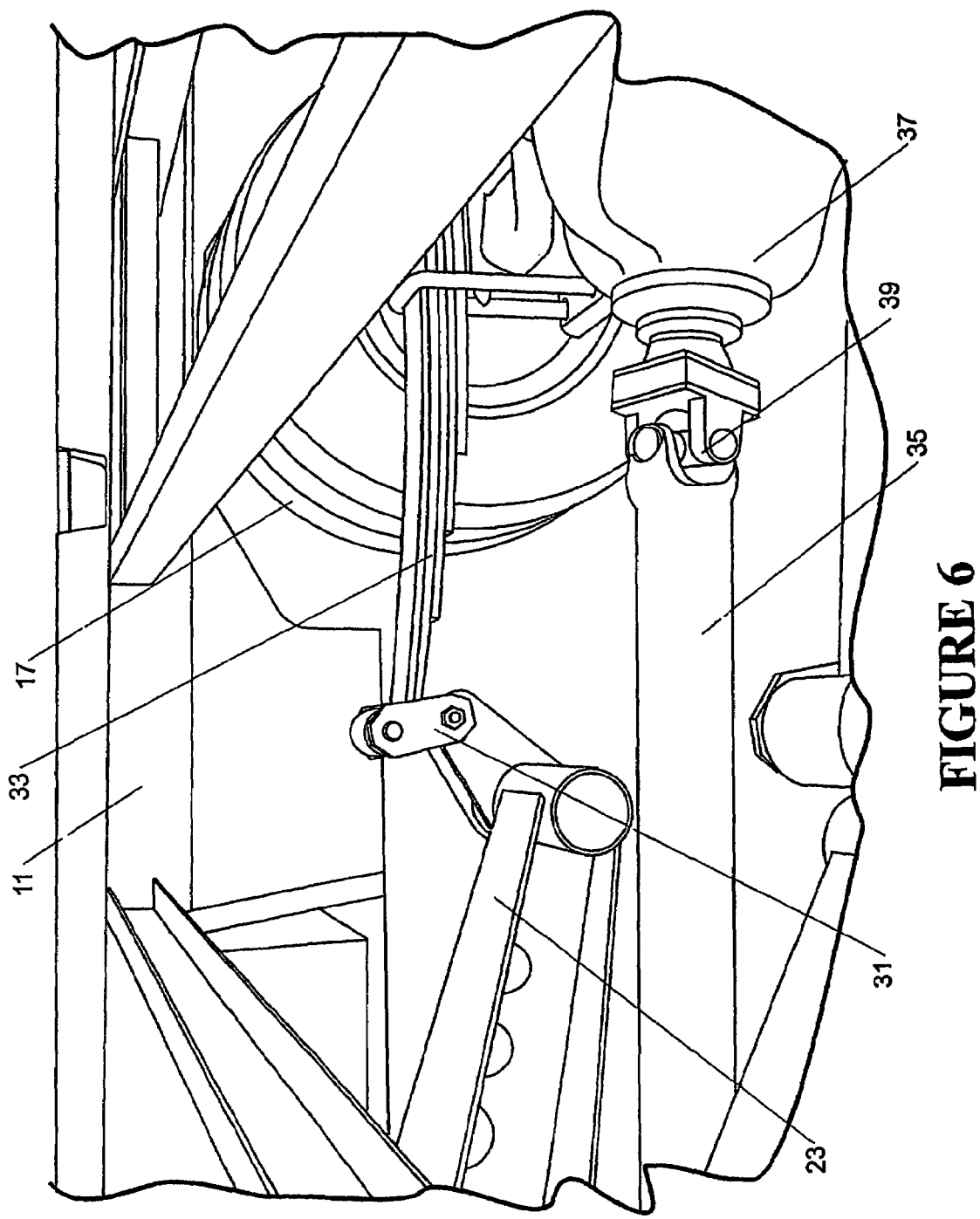
FIG. 6 shows the interaction between the chassis subframe member and a suspension leaf spring when the truck is in the transportation configuration.
Figure 7:
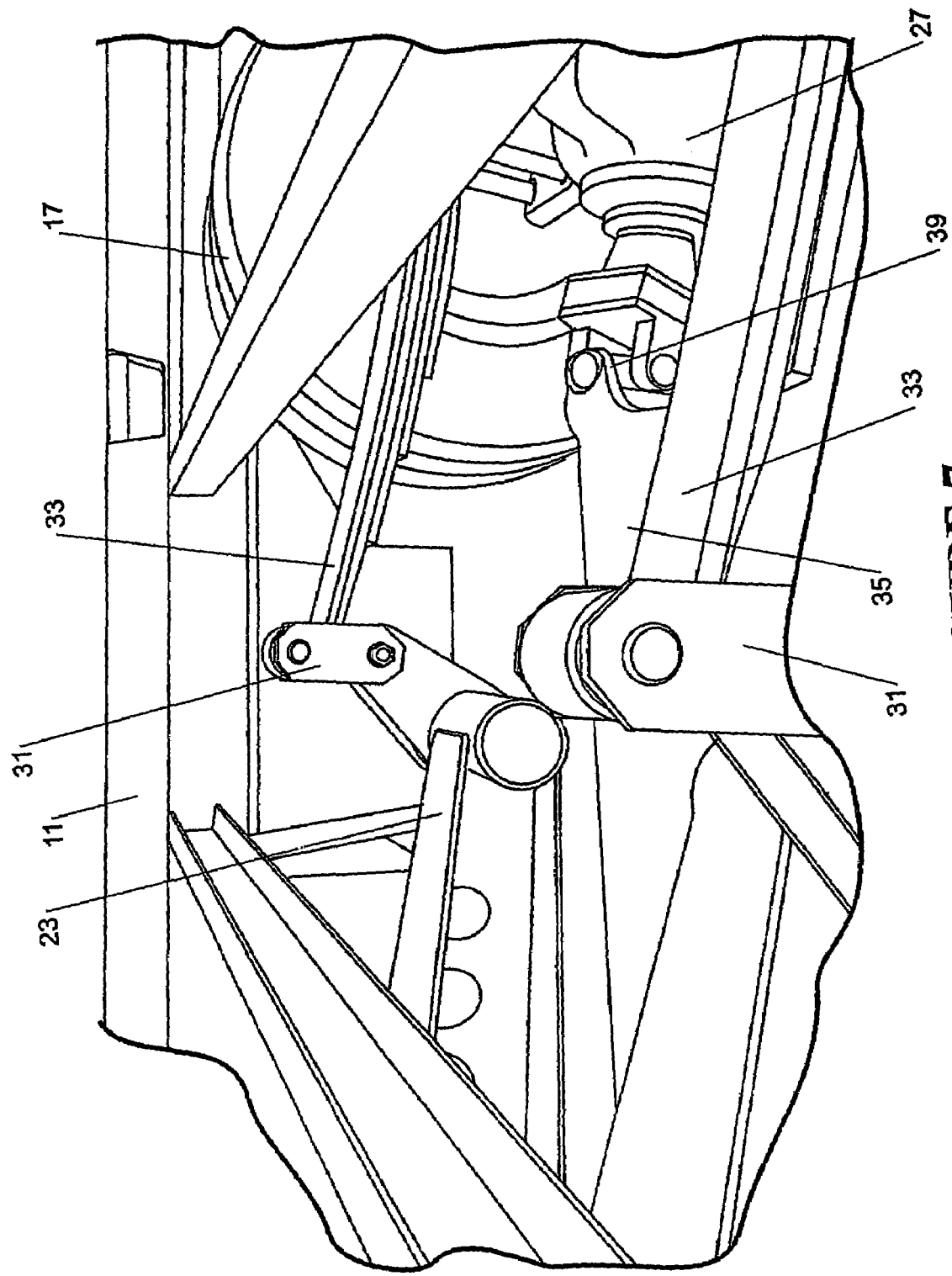
FIG. 7 shows the interaction between the chassis subframe member and a suspension leaf spring when the truck is in an intermediate configuration between the transportation configuration and loading/unloading configuration.
Figure 8:
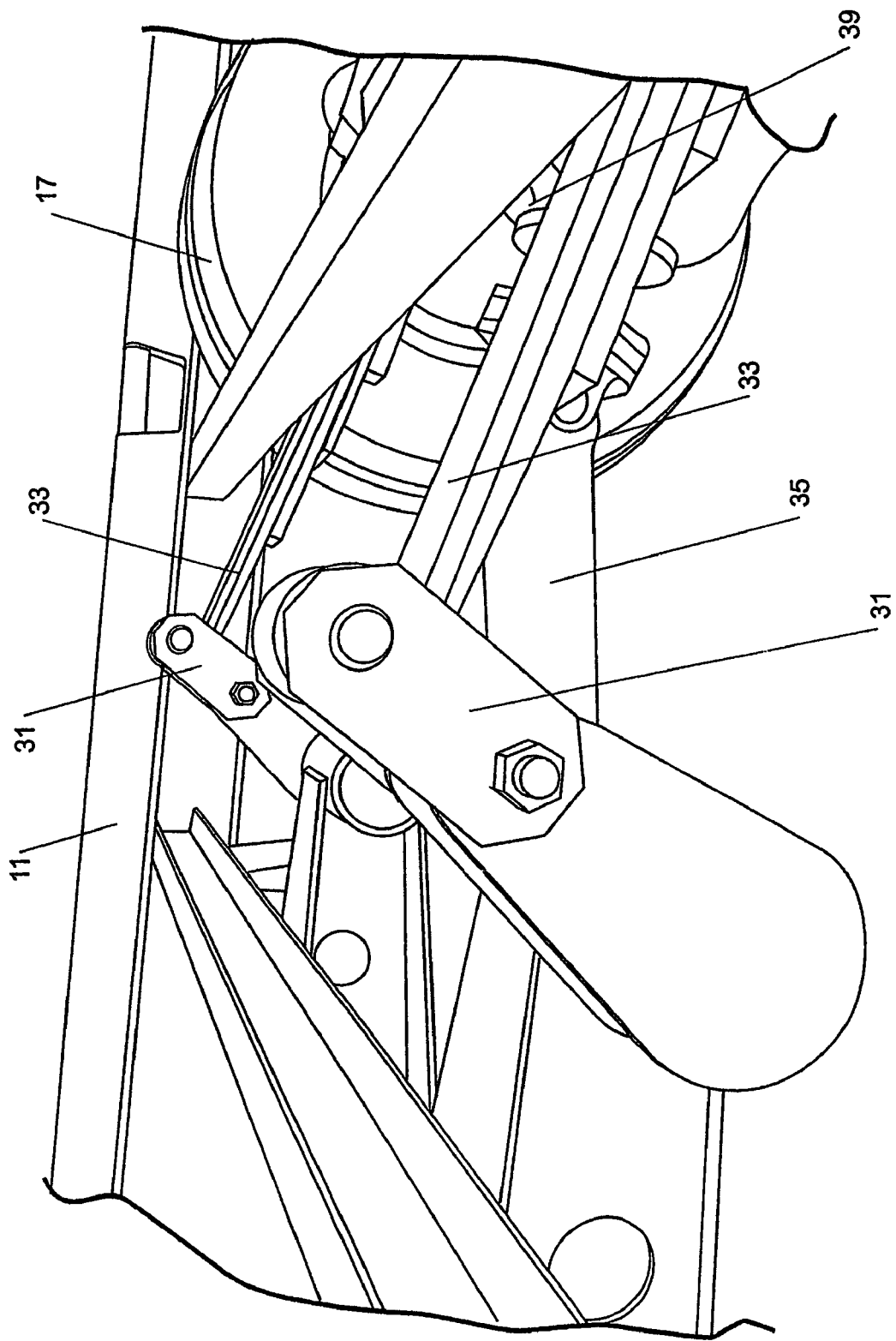
FIG. 8 the interaction between the chassis subframe member and a suspension leaf spring when the truck is in the loading/unloading configuration.

FIGS. 6 to 8 show the interaction of components of the tilting mechanism as the deck moves from the transport configuration, through an intermediate configuration, to a tilted loading/unloading configuration. As can be seen from these Figures, as the deck is tilted rearwardly towards the loading/unloading configuration shown in FIG. 6, the rear ends of the rearwardly extending chassis subframe arms 23 increase in height relative to the deck support frame 11. Accordingly, the spring connectors 31 also increase in height relative to the deck support frame 11, and the front ends of the leaf springs 33 are raised relative to the deck support frame 11. The deck support frame 11 and deck 9 are lowered relative to the rearmost axle 15 and wheels 17.

A driveshaft 35 extends rearwardly from an engine (not shown) supported by the chassis 1, to transmit motive power from the engine to the rearmost axle 15 and wheels 17 through a differential 37. It can be seen from FIGS. 6 to 8 that as the deck is tilted, the differential angle increases. Pivot 39 in the driveshaft accommodates this change in angle. As the deck is tilted, the driveshaft will be moved forwardly or rearwardly to a certain extent, which is accommodated by a conventional sliding driveshaft joint (not shown).

Figure 9:
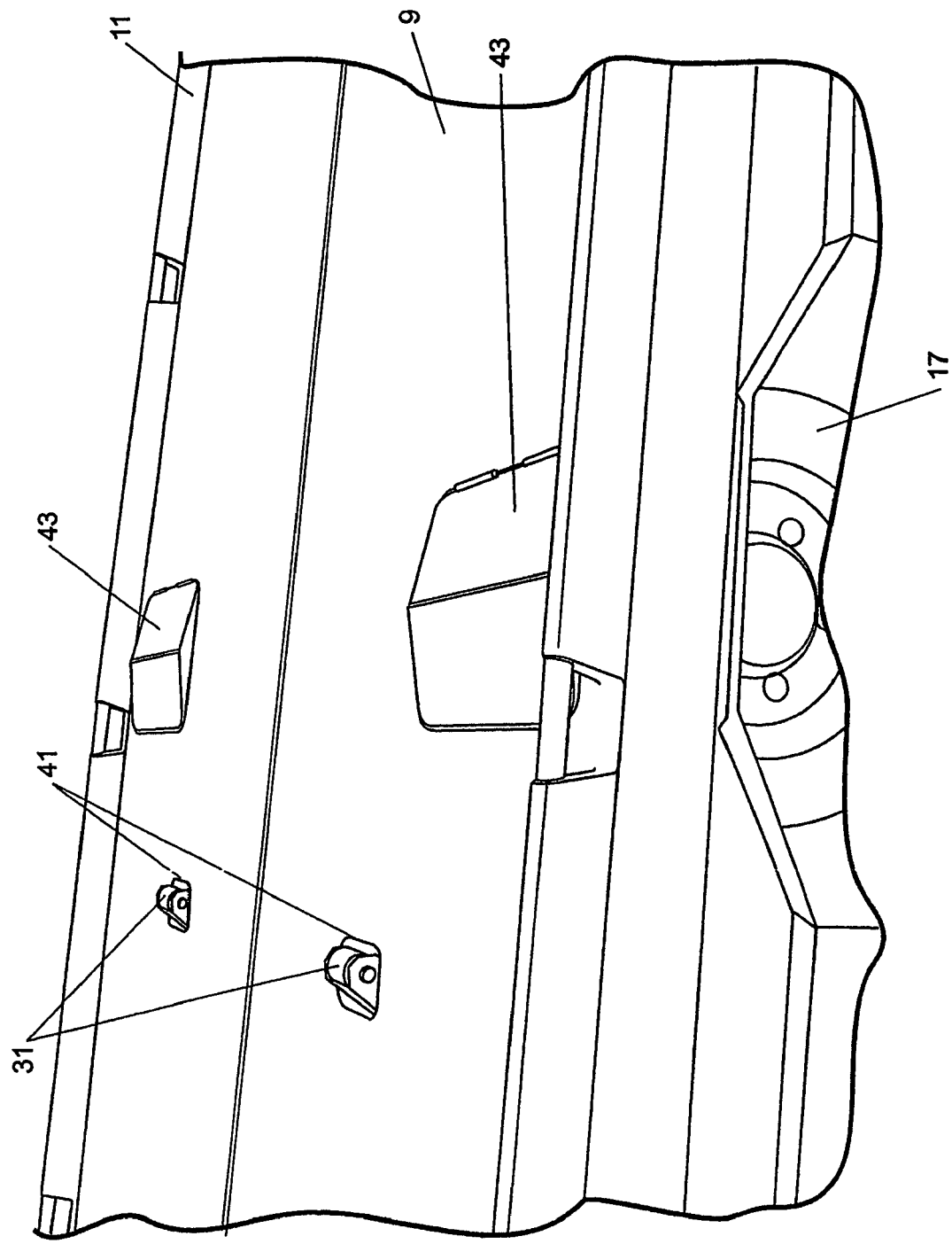
FIG. 9 is an overhead perspective view of a preferred embodiment deck when the truck is in the loading/unloading configuration.

In the particular embodiment shown, the change in angle and lowering of the deck as it moves to the tilted configuration is such that the spring connectors 31 and the upper parts of the rearmost wheels 17 will extend above a lower part of the deck 9. With reference to FIG. 9, a pair of apertures 41 is provided for receipt of the spring connectors 31 in the tilted configuration. A pair of hinged covers 43 is provided for receipt of the upper edges of the rearmost wheels. Moveable covers, apertures or shaped recesses could be provided in either position.

Figure 10:
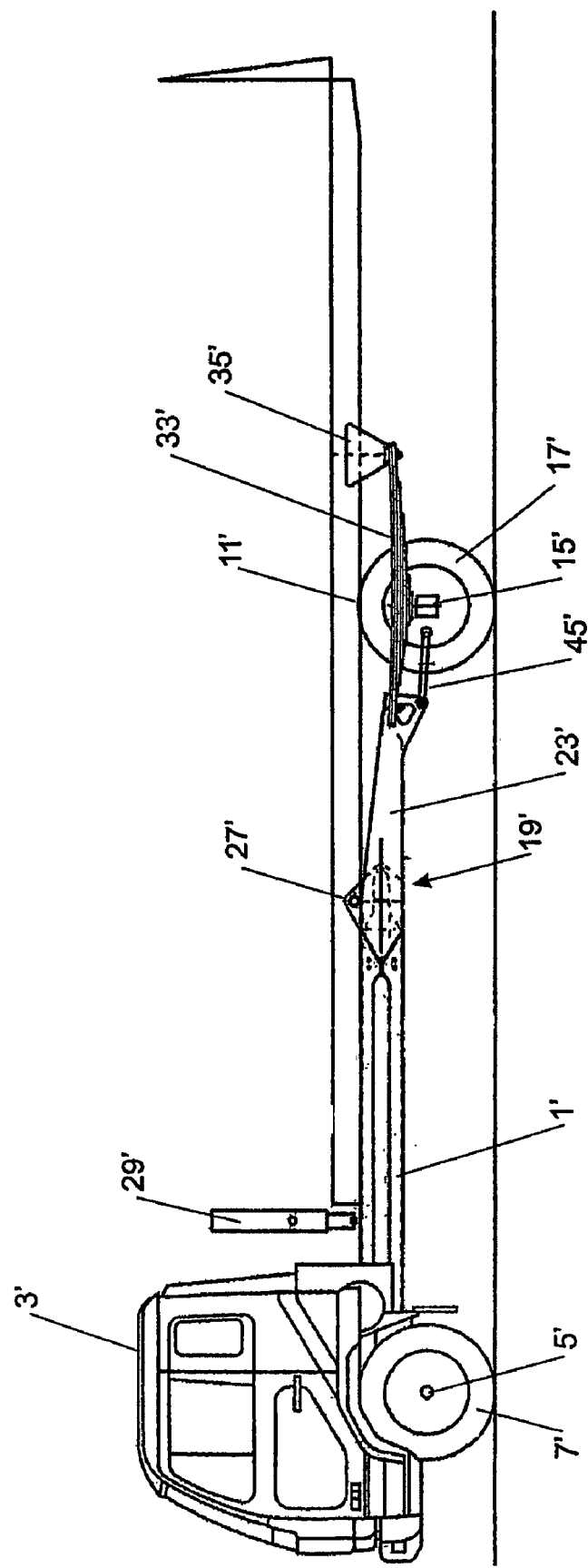
FIG. 10 is a schematic side elevation view of an alternative preferred embodiment truck.
Figure 11:
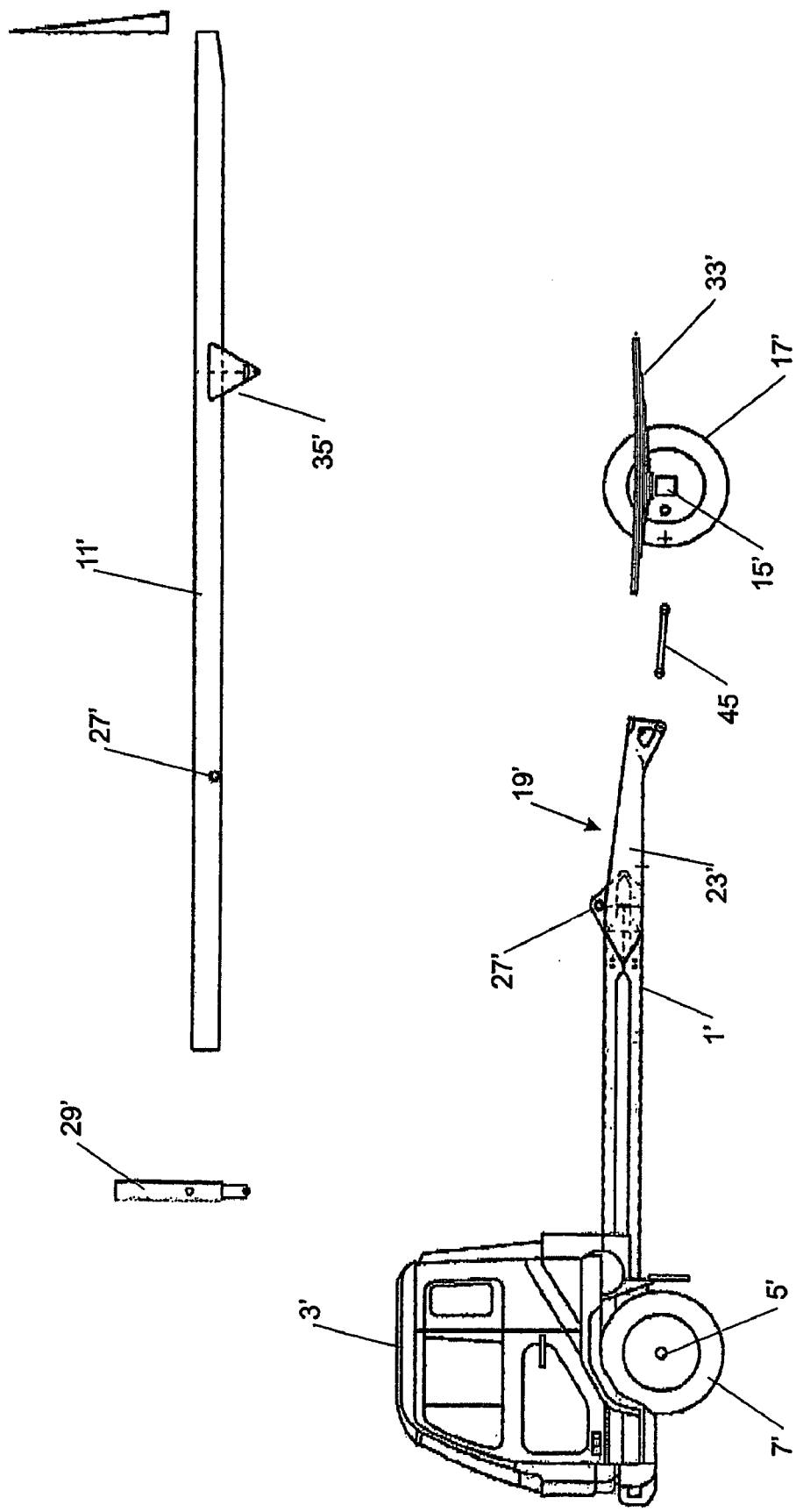
FIG. 11 is an exploded side elevation view of the main components of the truck of FIG. 10.
Figure 12C:
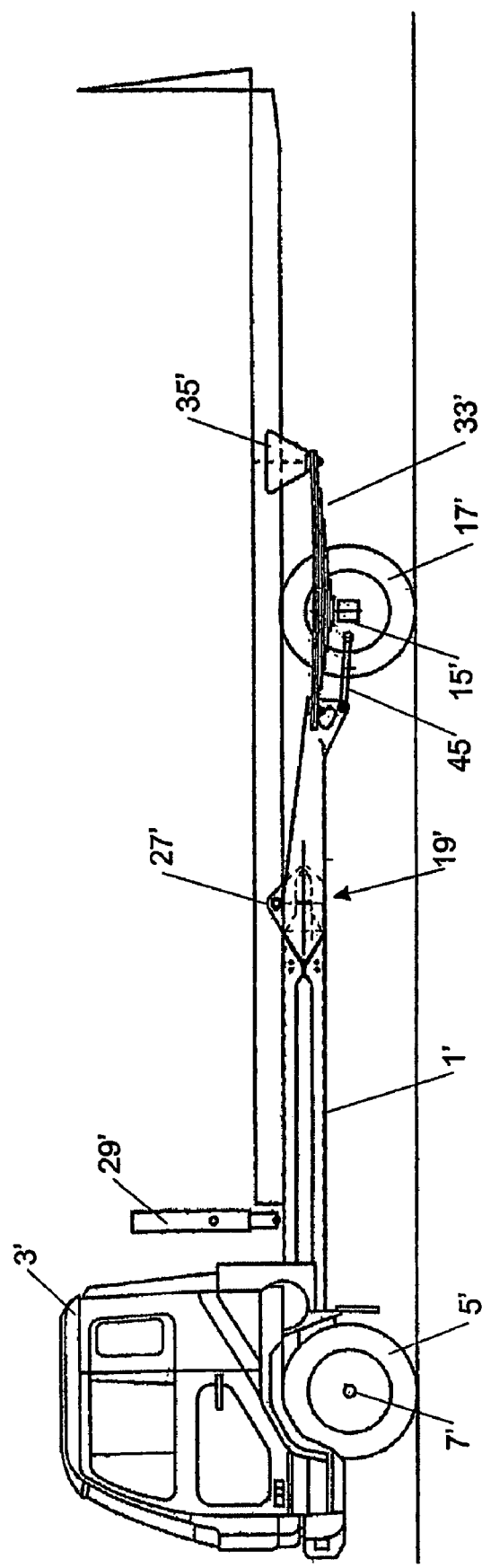
FIGS. 12a, 12b and 12c schematically show the truck of FIG. 10 in a transportation, intermediate, and loading/unloading configuration respectively.

It should be noted that the pivot axis and springs can be configured so that the connectors and wheels do not extend through the deck. Such a configuration is shown in FIGS. 10 to 12. Unless described below, the features should be considered to be the same as the embodiment described above, and like reference numerals are used to indicate like parts, with the addition of a prime ('). The primary differences are in the suspension arrangement.

It can be seen that the leaf springs 33' are longer and flatter than the leaf springs used in the embodiment of FIGS. 1 to 9. The front ends of the springs 33' are connected to the chassis subframe 19' by slippers 31' rather than eyelets or hangers. The rear ends of the springs 33' are connected to the deck support frame 11' by slippers 35'. The front and rear end slippers enable the springs to slide longitudinally within the slippers. Due to the flatter spring configuration, and the connection via the slippers, when the deck is moved to the tilted configuration the springs or connectors do not need to move above the deck. As the slippers enable the springs to move forwardly and rearwardly, the differential, and therefore the axle, are held in the correct position by one or more links 45' which extend rearwardly from the chassis subframe 19' to the differential (not shown).

This particular configuration is also such that, as the deck is in the tilted configuration, the rearmost wheels 17' engage against the underside of the deck, which provides additional braking to prevent undesirable movement of the truck when it is being loaded or unloaded.

It can also be seen that the axle 15' is connected to the leaf springs 33' in an offset configuration, such that a larger proportion of each spring is located behind the axle 17' than in front of the axle 17'. The advantage of this arrangement is that, as the deck is tilted to the loading/unloading configuration, the tilting of the differential relative to the drive shaft is less than it is in the embodiment of FIGS. 1 to 9.

Figure 13:
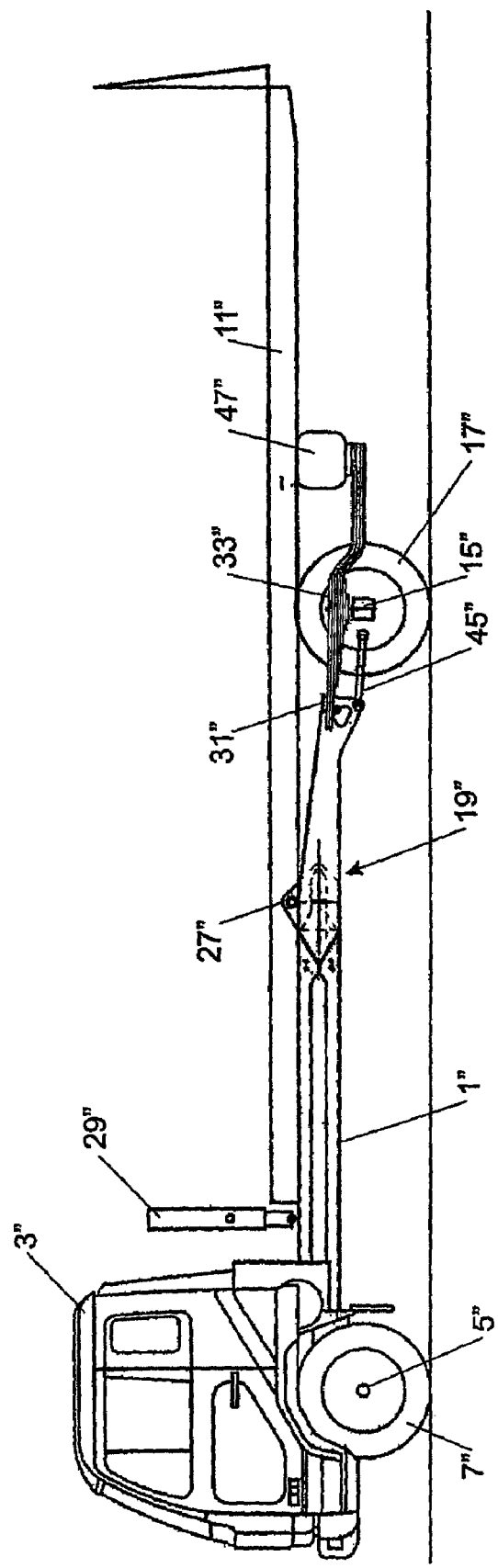
FIG. 13 schematically shows a truck similar to that of FIG. 10, but including air bags at the rear end of the leaf springs.

An alternative configuration truck is shown in FIG. 13. Unless described below, the features can be considered to be the same as the embodiment of FIGS. 10 to 12, and like reference numerals are used to indicate like parts, with the addition of a double prime ("). The primary difference is that this configuration utilises an air suspension arrangement with air bags. Again, leaf springs 33" extend rearwardly from slippers 31" carried by the chassis subframe member 19". The leaf springs 33" differ in that they are thicker single-leaf springs rather than the thinner multiple leaf springs used in the embodiments described above. Rather than the rear ends of the springs being connected to the deck support frame 11" by slippers or hangers, an air bag 47" extends between the rear end of each leaf spring 33" and the deck support frame 11".

As the hydraulic ram 29" is actuated, the chassis 1" will again tilt forwardly and the deck support frame 11" will again tilt rearwardly, with the front ends of the springs 33" being lifted upwardly by the chassis subframe member. The advantage of this configuration is that as the deck is tilted, the air can be expelled from the air bags 47", to further lower the deck on the rear end of the suspension. The air suspension may be configured to automatically expel air, and thereby lower, as the deck is tilted, or may be manually operable.

Any of the embodiments described above may be provided with a ramp arrangement or similar to assist in loading or unloading a vehicle from the truck deck. One suitable arrangement is shown in FIGS. 1 and 2, and comprises a tilting tail ramp 49 which is moveable from a raised position shown in FIG. 1 to an extended position shown in FIG. 2. In the raised position, the ramp 49 may serve as a barrier should the vehicle 12 roll towards the rear of the deck 9 during transport. If desired, to provide additional stability the ramp may be locked in the raised position by fasteners, a locking bar or the like.

As shown in FIG. 2, the ramp 49 is lowered outwardly to a point on or near the ground surface to provide smooth access for a vehicle 12 being loaded onto the deck 9 or offloaded from the deck 9. In the embodiment shown, a rigid supporting member 51 is positioned along the length of the underside of the ramp 49 to provide additional strength and support.

The ramp 49 may be hinged along fold-line 53 in addition to being hinged to the rear of the deck support frame 11 along hinge line 55. In this form, the ramp 49 is folded along its fold-line 53 and then raised into the vertical storage position (as shown in FIG. 1) where it may be locked in place by bolts, a locking bar, or the like. The rigid supporting member 51 preferably overlaps the fold-line 53 to provide strength and support.

Preferably, the rigid supporting member 51 is permanently affixed to the ramp 49 on one side of the fold-line 53.

The ramp 49 may have a textured surface to provide grip and may also include apertures to provide drainage for the deck. Part of the underside of the ramp may be angled so sit substantially flush with the ground when it is in the lowered position.

The ramp 49 may be raised and lowered manually or mechanically by hydraulic means for example. In a particularly preferred embodiment, the ramp is configured to automatically lower and unfold as the deck is tilted, and to automatically raise and fold as the deck is raised. The deck tilting actuator and the ramp actuator may be connected to the same hydraulic system for example. The system may include a valve to automatically adjust the ramp as the deck moves.

Other types of ramps may be used, such as a rigid ramp which is hinged to the deck or deck support frame, or a ramp or ramps which slide out from under the deck for example. Any of these embodiments are preferably configured to automatically extend as the deck is tilted, and to retract as the deck is raised. Another alternative is to provide a wheel lift which can be used as the ramp, and which would allow a further vehicle to be towed behind the truck in use.

The truck deck 9 preferably has a textured surface to provide grip for the wheels of a vehicle or vehicles being transported. The truck deck 9 may also have rails 57 along its sides provide lateral stability to vehicles on the deck. The rails 57 may be provided with apertures 59 through which cables and/or other tie downs, or the like, may be threaded to assist in the securement of transported vehicles. The apertures 59 may be positioned directly adjacent the surface of the deck 9 to provide drainage should the deck be wet.

Figure 14:
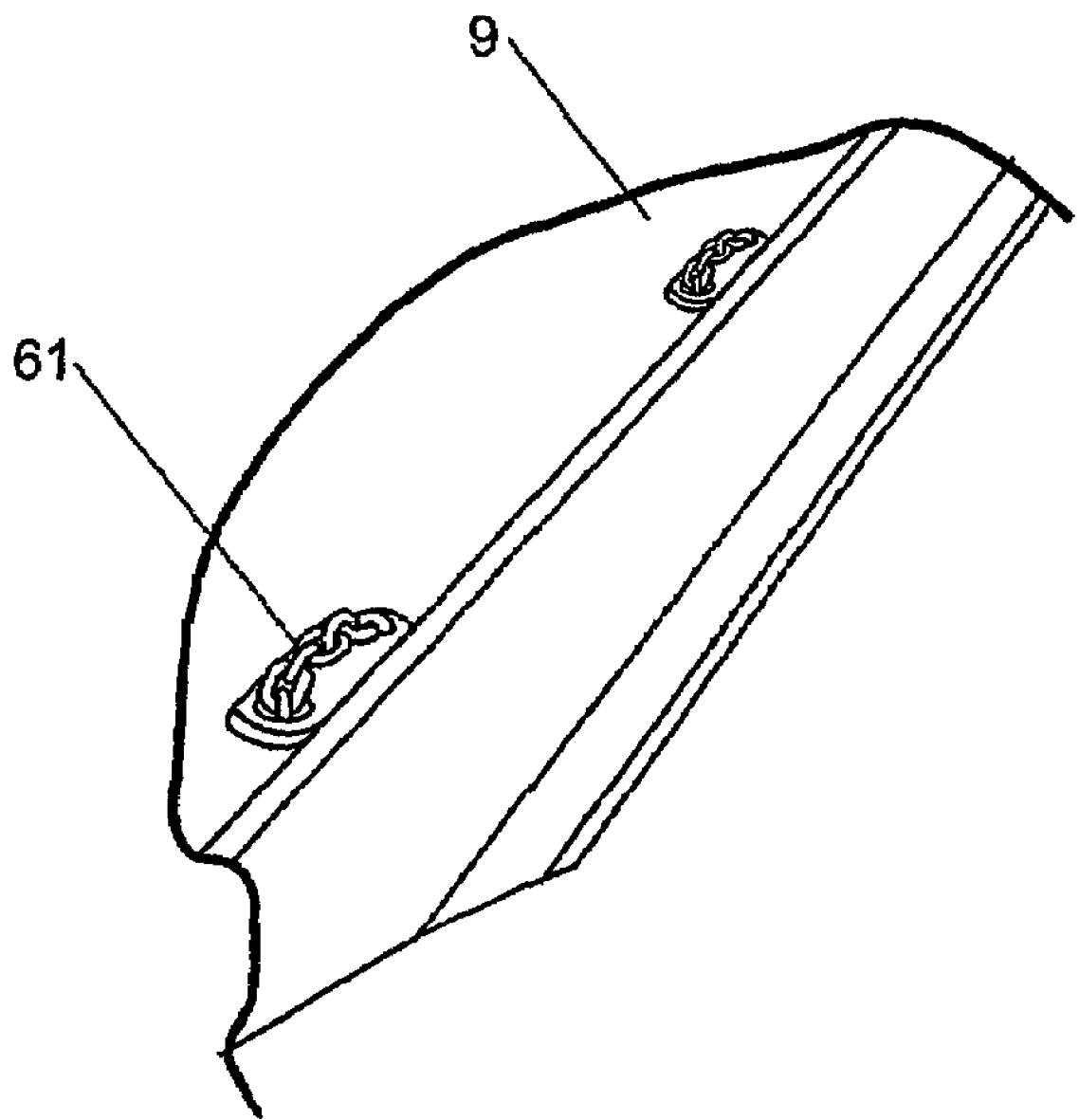
FIG. 14 is a view of a portion of one side of the truck deck showing looped chains positioned on the deck for securement of vehicles to the deck

In a particularly preferred embodiment, the truck deck is provided with looped fastening chains 61, as shown in FIG. 14. The chains may be affixed to the topside or underside of the deck 9 to allow a vehicle to be secured to the deck via attachment to the chains using a racking bar or the like.

The preferred embodiments described above provide a relatively shallow deck loading/unloading angle, which enhances the ease of loading or unloading a vehicle onto or off the deck. Further, the preferred embodiments do not require any significant free space behind the deck for loading or unloading a vehicle.

Preferred embodiments of the invention have been described by way of example only and modifications may be made thereto without departing from the scope of the invention.

For example, the embodiments described above utilise a deck support frame to support the deck. Instead of utilising a frame, a strengthened deck could be used which is connected to the suspension and chassis or chassis subframe.

The preferred means for actuating the ramp and deck tilting are described as being hydraulic actuators. However, a pneumatic or mechanical system could be used for example.

In the embodiment shown in FIGS. 1 and 2, the deck is configured for receipt of a single utility vehicle. The decks could be provided in longer or shorter configurations as required, such as for receipt of two vehicles.

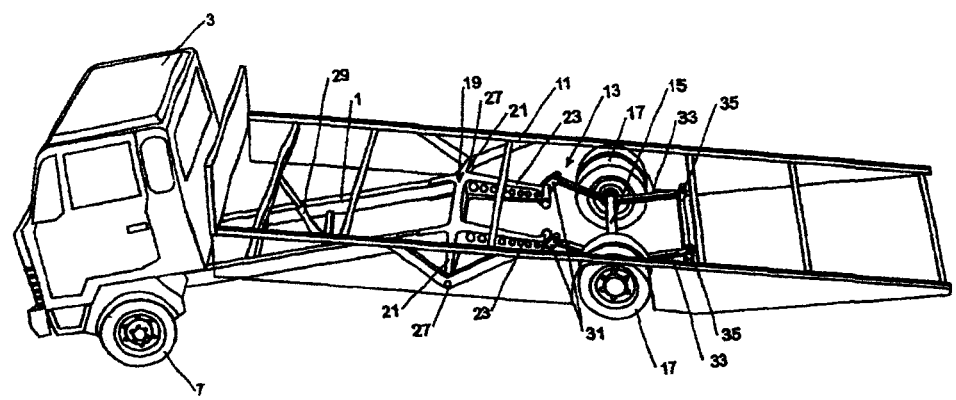

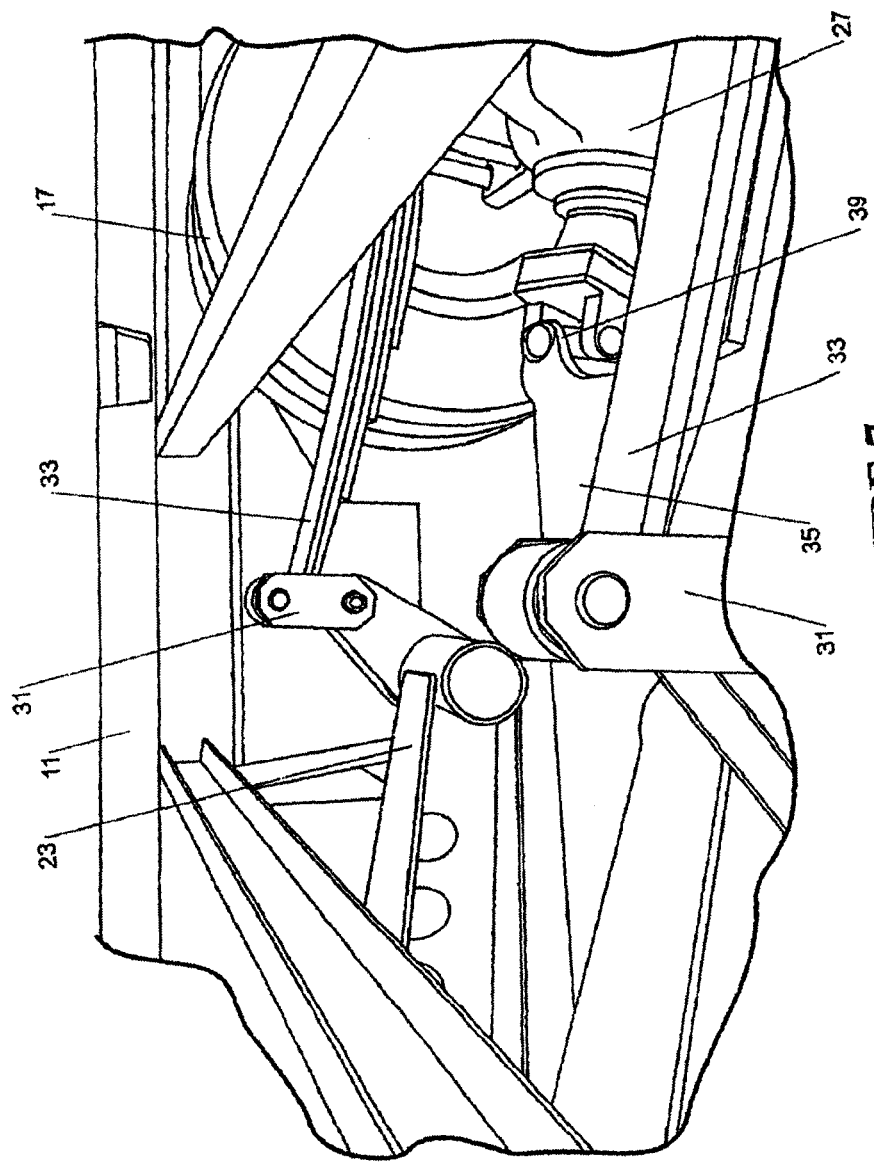

We claim:

1. A truck comprising:
    a rear axle and wheel assembly;
    a chassis having a forward portion that supports a cab, a terminal portion that terminates at a location forward of said rear axle and wheel assembly, a pivot portion located between the forward portion and the terminal portion, and an initial orientation relative to the ground, wherein the cab is at a forward end of the truck;
    a deck that is rearward of the cab and having a forward portion that overlies the terminal portion and the pivot portion of said chassis and a rearward portion that extends rearward of the rear axle and wheel assembly; and
    a suspension spring having a forward part connected to the terminal portion of said chassis, a rearward part connected to the rearward portion of said deck, and an intermediate part connected to the rear axle and wheel assembly;
    wherein said deck is operatively connected to the pivot portion of said chassis so as to be tiltable relative to the chassis about a horizontal pivot axis in the pivot portion, and is configured such that when the deck is tilted rearwardly about the pivot axis, the chassis tilts forwardly from the initial orientation and the forward part of the suspension spring moves with the chassis such that said forward part of the suspension spring moves toward a part of the deck immediately above the forward part of the suspension spring such that a vertical spacing between the forward part of the suspension spring and that part of the deck is reduced, and such that a part of the deck immediately above the rearmost axle lowers towards the rearmost axle to provide a low loading angle for the deck.

2. A truck as claimed in claim 1, wherein the truck comprises a deck support frame, and the rearward part of the suspension spring is connected to the rearward portion of said deck via said deck support frame.

3. A truck as claimed in claim 1, wherein the suspension spring comprises a leaf spring and an air bag, with the rearward part of the leaf spring connected to the deck via the air bag.

4. A truck comprising: a chassis supporting a cab and that has an initial orientation relative to the ground, wherein the cab is at a forward end of the truck; and a deck which is supported at least partly by a rearmost axle and wheels by a suspension arrangement, said suspension arrangement comprising a leaf spring suspension with a forward part of the suspension arrangement operatively connected to the chassis to move with the chassis and a rear part of the suspension arrangement operatively connected to the deck or a deck support frame to move with the deck or deck support frame, said leaf spring suspension comprising a pair of spaced apart leaf springs, with the rear ends of the leaf springs operatively connected to the deck or deck support frame, and the front ends of the leaf springs operatively connected to the chassis, so that as the deck tilts the front ends of the leaf springs move upwardly toward the part of the deck immediately above the front ends of the leaf springs, thereby lowering the deck towards the axle, wherein the deck is tiltable relative to the chassis about a pivot axis that provides a center of rotation of the deck or deck support frame relative to the chassis and that is located in front of the rearmost axle of the truck and arranged such that as the deck tilts rearwardly, the chassis tilts forwardly from the initial orientation and the forward part of the suspension arrangement moves with the chassis such that said forward part of the suspension arrangement moves upwardly toward a part of the deck immediately above the forward part of the suspension arrangement such that a vertical spacing between the forward part of the suspension arrangement and that part of the deck is reduced, and such that a part of the deck immediately above the rearmost axle lowers towards the rearmost axle to provide a low loading angle of the deck, wherein said deck comprises a pair of apertures, shaped recesses or moveable covers which enable the front ends of the leaf springs to extend above a lower part of the deck when the deck is tilted.

* * * * *

UNITED STATES PATENT AND TRADEMARK OFFICE
CERTIFICATE OF CORRECTION

| | | |
|---|---|---|
| PATENT NO. | : 7,651,312 B2 | |
| APPLICATION NO. | : 10/531488 | |
| DATED | : January 26, 2010 | |
| INVENTOR(S) | : Armour et al. | |

It is certified that error appears in the above-identified patent and that said Letters Patent is hereby corrected as shown below:

Delete Title Page, substitute new Title Page, 16 Drawing Sheets to 14 Drawing Sheets.

Title Page, Item (73) Assignee:
The middle name of first Assignee should be -- Douglas --.

Title Page, Item (73) Assignee:
The first name of second Assignee should be -- Fiona --.

In the Drawings:

Drawing Sheets 1 through 5 (Figure 1A through Figure 5B) should be replaced with the attached sheets (1-3) containing Figure 1 through Figure 4.

Renumber Drawing Sheets 6-16 to Drawing Sheets 4-14.

Signed and Sealed this

Eighteenth Day of May, 2010

David J. Kappos
*Director of the United States Patent and Trademark Office*

(12) United States Patent
Armour et al.

(10) Patent No.: US 7,651,312 B2
(45) Date of Patent: Jan. 26, 2010

(54) TRUCK WITH TILTING DECK

(75) Inventors: Barry Douglas Armour, Dunedin (NZ); Richard Zane Wilson, Dunedin (NZ)

(73) Assignees: Barry Douglass Armour, Dunedin (NZ); Fionna Lynn Armour, Dunedin (NZ); HGW Trustee's Limited, Dunedin (NZ)

( * ) Notice: Subject to any disclaimer, the term of this patent is extended or adjusted under 35 U.S.C. 154(b) by 68 days.

(21) Appl. No.: 10/531,488

(22) PCT Filed: Oct. 22, 2003

(86) PCT No.: PCT/NZ03/00239
§ 371 (c)(1),
(2), (4) Date: Mar. 3, 2006

(87) PCT Pub. No.: WO2004/037604
PCT Pub. Date: May 6, 2004

(65) Prior Publication Data
US 2006/0182572 A1    Aug. 17, 2006

(30) Foreign Application Priority Data
Oct. 22, 2002  (NZ) ............................ 522096
Dec. 6, 2002  (NZ) ............................ 523072
Feb. 26, 2003  (NZ) ............................ 524432

(51) Int. Cl.
*B60P 3/00*    (2006.01)

(52) U.S. Cl. .................... 414/476; 414/474; 414/563; 298/12; 298/17 R; 298/22 R; 280/86; 280/787

(58) Field of Classification Search .............. 414/476, 414/563, 474; 298/12, 17 R, 22 R; 280/86, 280/787
See application file for complete search history.

(56) References Cited

U.S. PATENT DOCUMENTS

| | | |
|---|---|---|
| 2,466,452 A | 4/1949 | Lisota |
| 2,466,791 A | 4/1949 | Cook |
| 3,228,547 A | 1/1966 | Coordes |
| 4,239,275 A | 12/1980 | Horneys et al. |
| 4,318,658 A | 3/1982 | McIntyre |
| 4,368,002 A | 1/1983 | Kryzyosiak, Jr. |
| 4,730,974 A | 3/1988 | Andre |
| 4,750,856 A | 6/1988 | Lapiolahti |
| 4,770,592 A | 9/1988 | Winter |

(Continued)

FOREIGN PATENT DOCUMENTS

DE    295 12 152    6/1996

(Continued)

*Primary Examiner*—Michael S Lowe
(74) *Attorney, Agent, or Firm*—Dann, Dorfman, Herrell and Skillman, P.C.

(57) ABSTRACT

A truck includes a chassis 1 supporting a cab 3 and a deck 9 which is supported at least by a rearmost axle 15 and wheels 17. The deck 9 is tiltable relative to the chassis 1 about a pivot axis 27 located in front of the rearmost axle 15 of the truck and arranged such that as the deck 9 tilts rearwardly, the chassis 1 tilts forwardly and the deck 9 lowers towards the rearmost axle. A forward part of a rear suspension arrangement may be operatively connected to the chassis 1 so that the forward part moves upwardly towards the deck 9 as the deck 9 is tilted.

4 Claims, 14 drawing Sheets

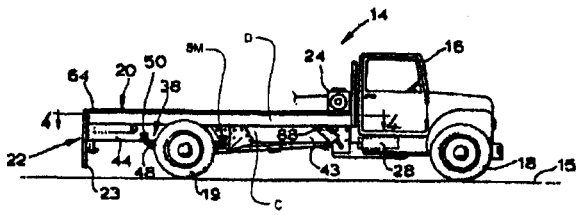
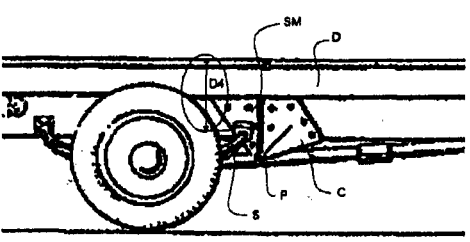

UNITED STATES PATENT AND TRADEMARK OFFICE
CERTIFICATE OF CORRECTION

| | |
|---|---|
| PATENT NO. | : 7,651,312 B2 |
| APPLICATION NO. | : 10/531488 |
| DATED | : January 26, 2010 |
| INVENTOR(S) | : Armour et al. |

It is certified that error appears in the above-identified patent and that said Letters Patent is hereby corrected as shown below:

Delete Title Page, substitute new Title Page, consisting of corrected illustrative figure.

Title Page, Item (73) Assignee:
The middle name of first Assignee should be -- Douglas --.

Title Page, Item (73) Assignee:
The first name of second Assignee should be -- Fiona --.

In the Drawings:
Drawing Sheets 1 through 16 should be replaced with the attached Drawing Sheets 1-14.

This certificate supersedes the Certificate of Correction issued May 18, 2010.

Signed and Sealed this
Twenty-sixth Day of April, 2011

David J. Kappos
*Director of the United States Patent and Trademark Office*

(12) United States Patent
Armour et al.

(10) Patent No.: US 7,651,312 B2
(45) Date of Patent: Jan. 26, 2010

(54) TRUCK WITH TILTING DECK

(75) Inventors: Barry Douglas Armour, Dunedin (NZ); Richard Zane Wilson, Dunedin (NZ)

(73) Assignees: Barry Douglass Armour, Dunedin (NZ); Fionna Lynn Armour, Dunedin (NZ); HGW Trustee's Limited, Dunedin (NZ)

( * ) Notice: Subject to any disclaimer, the term of this patent is extended or adjusted under 35 U.S.C. 154(b) by 68 days.

(21) Appl. No.: 10/531,488

(22) PCT Filed: Oct. 22, 2003

(86) PCT No.: PCT/NZ03/00239
§ 371 (c)(1),
(2), (4) Date: Mar. 3, 2006

(87) PCT Pub. No.: WO2004/037604
PCT Pub. Date: May 6, 2004

(65) Prior Publication Data
US 2006/0182572 A1 Aug. 17, 2006

(30) Foreign Application Priority Data
Oct. 22, 2002 (NZ) .................... 522096
Dec. 6, 2002 (NZ) .................... 523072
Feb. 26, 2003 (NZ) .................... 524432

(51) Int. Cl.
*B60P 3/00* (2006.01)
(52) U.S. Cl. .................... 414/476; 414/474; 414/563; 298/12; 298/17 R; 298/22 R; 280/86; 280/787

(58) Field of Classification Search .................... 414/476, 414/563, 474; 298/12, 17 R, 22 R; 280/86, 280/787
See application file for complete search history.

(56) References Cited

U.S. PATENT DOCUMENTS

| | | |
|---|---|---|
| 2,466,452 A | 4/1949 | Lisota |
| 2,466,791 A | 4/1949 | Cook |
| 3,228,547 A | 1/1966 | Coordes |
| 4,239,275 A | 12/1980 | Horneys et al. |
| 4,318,658 A | 3/1982 | McIntyre |
| 4,368,002 A | 1/1983 | Kryzyosiak, Jr. |
| 4,730,974 A | 3/1988 | Andre |
| 4,750,856 A | 6/1988 | Lapiolahti |
| 4,770,592 A | 9/1988 | Winter |

(Continued)

FOREIGN PATENT DOCUMENTS

DE 295 12 152 6/1996

(Continued)

*Primary Examiner*—Michael S Lowe
(74) *Attorney, Agent, or Firm*—Dann, Dorfman, Herrell and Skillman, P.C.

(57) ABSTRACT

A truck includes a chassis 1 supporting a cab 3 and a deck 9 which is supported at least by a rearmost axle 15 and wheels 17. The deck 9 is tiltable relative to the chassis 1 about a pivot axis 27 located in front of the rearmost axle 15 of the truck and arranged such that as the deck 9 tilts rearwardly, the chassis 1 tilts forwardly and the deck 9 lowers towards the rearmost axle. A forward part of a rear suspension arrangement may be operatively connected to the chassis 1 so that the forward part moves upwardly towards the deck 9 as the deck 9 is tilted.

4 Claims, 14 Drawing Sheets